United States Patent
Mitsumoto

(10) Patent No.: US 11,358,638 B2
(45) Date of Patent: Jun. 14, 2022

(54) VEHICLE DISTURBANCE HANDLING SYSTEM

(71) Applicant: TOYOTA JIDOSHA KABUSHIKI KAISHA, Toyota (JP)

(72) Inventor: Hisanori Mitsumoto, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/926,988

(22) Filed: Jul. 13, 2020

(65) Prior Publication Data

US 2021/0016829 A1 Jan. 21, 2021

(30) Foreign Application Priority Data

Jul. 15, 2019 (JP) .............................. JP2019-130781

(51) Int. Cl.
*B62D 6/00* (2006.01)
*B62D 15/02* (2006.01)
*B62D 6/04* (2006.01)

(52) U.S. Cl.
CPC ............. *B62D 15/025* (2013.01); *B62D 6/04* (2013.01)

(58) Field of Classification Search
USPC .................................................... 701/36–48
See application file for complete search history.

(56) References Cited

U.S. PATENT DOCUMENTS

| 8,118,126 B2* | 2/2012 | Rattapon ................ B62D 1/286 701/41 |
| 10,730,555 B2* | 8/2020 | Minoiu Enache .... B60W 30/12 |
| 2001/0003810 A1* | 6/2001 | Shinmura ................. B60T 7/22 340/903 |
| 2002/0169531 A1* | 11/2002 | Kawazoe ............. B62D 5/0463 180/443 |
| 2005/0096826 A1* | 5/2005 | Iwasaka .............. B60T 8/17557 701/1 |
| 2009/0198408 A1* | 8/2009 | Salman ............. B60W 50/0205 701/29.2 |
| 2010/0262328 A1* | 10/2010 | Ammon .............. B60T 8/17551 701/31.4 |

(Continued)

FOREIGN PATENT DOCUMENTS

| JP | 2005-239012 A | 9/2005 |
| JP | 2018-001848 A | 1/2018 |
| JP | 2020-083236 A | 6/2020 |

*Primary Examiner* — Jonathan L Sample
(74) *Attorney, Agent, or Firm* — Sughrue Mion, PLLC

(57) ABSTRACT

A disturbance handling system for a vehicle to handle a disturbance, the disturbance being an external force that acts on the vehicle and causes deflection of the vehicle, including: a disturbance detecting portion configured to determine an occurrence of the disturbance and to estimate a degree of influence of the disturbance; and a disturbance handling portion configured to handle the disturbance based on the estimated degree of influence of the disturbance, wherein, when a deviation of an actual yaw rate from a standard yaw rate is larger than a set threshold, the disturbance detecting portion determines that the disturbance is occurring and increases the set threshold in a situation in which the vehicle is being automatically steered, the standard yaw rate being a yaw rate of the vehicle determined based on a steering operation.

8 Claims, 11 Drawing Sheets

(56) References Cited

U.S. PATENT DOCUMENTS

| | | | |
|---|---|---|---|
| 2013/0190984 A1* | 7/2013 | Kawai | B62D 6/00 |
| | | | 701/41 |
| 2015/0019082 A1* | 1/2015 | Inoue | B62D 15/025 |
| | | | 701/41 |
| 2015/0166063 A1* | 6/2015 | Ishihara | B60W 60/0051 |
| | | | 701/41 |
| 2015/0246687 A1* | 9/2015 | Takeda | B62D 15/025 |
| | | | 701/41 |
| 2016/0129938 A1* | 5/2016 | Okuda | B60W 50/10 |
| | | | 701/41 |
| 2017/0151979 A1* | 6/2017 | Maeda | B62D 5/0493 |
| 2018/0210447 A1* | 7/2018 | Myers | B60W 50/14 |
| 2018/0346019 A1* | 12/2018 | Fujii | B62D 6/003 |
| 2019/0031236 A1* | 1/2019 | Shiraishi | B62D 15/025 |
| 2020/0017112 A1* | 1/2020 | Sakurada | B60W 50/08 |
| 2021/0016769 A1* | 1/2021 | Mitsumoto | B62D 6/04 |
| 2021/0197812 A1* | 7/2021 | Watanabe | B60W 50/00 |

* cited by examiner

VEHICLE DISTURBANCE HANDLING SYSTEM

CROSS REFERENCE TO RELATED APPLICATION

The present application claims priority to Japanese Patent Application No. 2019-130781, which was filed on Jul. 15, 2019, the disclosure of which is herein incorporated by reference in its entirety.

BACKGROUND

Technical Field

The following disclosure relates to a vehicle disturbance handling system for handling a disturbance, such as a crosswind, that causes deflection of a vehicle.

Description of Related Art

When an external disturbance such as a crosswind acts on the vehicle during running of the vehicle, the vehicle is deflected. A system for detecting the disturbance and handling the detected disturbance, namely, a vehicle disturbance handling system, has been actively developed in recent years. For instance, Patent Document 1 (Japanese Patent Application Publication No. 2018-1848) and Patent Document 2 (Japanese Patent Application Publication No. 2005-239012) disclose techniques relating to the vehicle disturbance handling system.

SUMMARY

For instance, the Patent Document 1 discloses a technique in which a steering angle is corrected based on lateral acceleration that is being generated in a vehicle, and a braking force and a drive force are distributed to right and left wheels based on a yaw variation of the vehicle. In a case where the disturbance is handled or coped with by a steering device, a steering operation member may undesirably move abruptly, so that a driver may feel unnatural. In a case where the disturbance is handled or coped with by a brake device, the vehicle may considerably decelerate if the driver keeps applying brakes. For instance, the Patent Document 2 discloses a technique in which the disturbance is estimated based on parameters such as an operation angle of the steering operation member, a running speed of the vehicle, a yaw rate of the vehicle, and lateral acceleration being generated in the vehicle. Even if such estimation is performed, in a situation in which driving assistance by automatic steering is being performed, erroneous determination that the disturbance is occurring may be made when an operation force applied to the steering operation member by the driver conflicts with a steering force of the wheels by the automatic steering. These are just a few examples of problems that the conventional vehicle disturbance handling systems have experienced. Thus, there remains much room for improvement in the vehicle disturbance handling system, and some modifications can enhance utility of the system. Accordingly, one aspect of the present disclosure is directed to a vehicle disturbance handling system having high utility.

In one aspect of the present disclosure, a vehicle disturbance handling system for a vehicle is a system to handle a disturbance that is an external force that acts on the vehicle and causes deflection of the vehicle, the system including:

a disturbance detecting portion configured to determine an occurrence of the disturbance and to estimate a degree of influence of the disturbance; and a disturbance handling portion configured to handle the disturbance based on the estimated degree of influence of the disturbance, wherein, when a deviation of an actual yaw rate from a standard yaw rate is larger than a set threshold, the disturbance detecting portion determines that the disturbance is occurring and increases the set threshold in a situation in which the vehicle is being automatically steered, the standard yaw rate being a yaw rate of the vehicle determined based on a steering operation.

In a case where a driver performs a steering operation that counters or opposes automatic steering, namely, a counter operation, the determination based on the deviation of the yaw rate may cause a possibility that a behavior of the vehicle that results from the counter operation is determined to be due to a disturbance. That is, there is a possibility of erroneous determination as to the occurrence of the disturbance. According to the disturbance handling system, the set threshold for the determination is changed to eliminate the possibility of the erroneous determination in a situation in which the vehicle is being automatically steered.

Various Forms

There will be hereinafter exemplified and explained various forms of the vehicle disturbance handling system of the present disclosure. Each of the forms is numbered like the appended claims and depends from the other form or forms, where appropriate. This is for easier understanding of the present disclosure, and it is to be understood that combinations of constituent elements that constitute the present disclosure are not limited to those described in the following forms. That is, it is to be understood that the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the present disclosure.

(1) A disturbance handling system for a vehicle to handle a disturbance, the disturbance being an external force that acts on the vehicle and causes deflection of the vehicle, including:

a disturbance detecting portion configured to determine an occurrence of the disturbance and to estimate a degree of influence of the disturbance; and a disturbance handling portion configured to handle the disturbance based on the estimated degree of influence of the disturbance.

This form is a basic form of the vehicle disturbance handling system of the present disclosure. The disturbance detecting portion and the disturbance handling portion in this form may be constituted as one unit whose main constituent element is a computer. Alternatively, each of the disturbance detecting portion and the disturbance handling portion may be constituted by at least one unit whose main constituent element is a computer. In a case where the disturbance detecting portion and the disturbance handling portion function independently of each other as a disturbance detecting device and a disturbance handling device, respectively, the present disclosure may belong to a category of the disturbance detecting device and/or the disturbance handling device, instead of a category of the vehicle disturbance handling system (hereinafter simply referred to as "system" where appropriate).

The determination of the occurrence of the disturbance is a concept widely including determination or judgment of a fact that the disturbance is now occurring, a fact that the disturbance has just occurred, a time point of the occurrence of the disturbance (i.e., a time point when the disturbance begins to occur), presence or absence of the occurrence of the disturbance, etc. In this form, all of mutually different types of disturbances may be: a target for determination of the occurrence or detection; and a target for handling. Alternatively, at least one disturbance, as a part of those disturbances, may be: a target for determination of the occurrence or detection; and a target for handling.

(2) The disturbance handling system according to the form (1), which is configured to handle the disturbance due to a crosswind.

In this form, the type of the disturbance to be handled or coped with is limited. The crosswind is a typical disturbance that causes deflection of the vehicle. It is noted that the system according to the present disclosure is not limited to the system for handling the crosswind but may be a system for handling a disturbance that occurs when the vehicle is running on a split µ road, namely, when right and left wheels of the vehicle pass over respective road surfaces of mutually different frictional coefficients. Specifically, when one of the right and left wheels passes over wet steel plates or runs through puddles, a yaw moment as an external force acts on the vehicle, so that the vehicle is deflected. The system according to the present disclosure may be a system for detecting such external force and handling such deflection that arises from the external force.

(11) The disturbance handling system according to the form (1) or (2), wherein, when it is determined that the disturbance is occurring, the disturbance handling portion controls a brake device and a steering device of the vehicle to handle the disturbance.

In this form and some of the following forms, the disturbance handling portion is limited. When the disturbance is handled by both the brake device and the steering device as described in this form, the disturbance can be handled more reliably than when the disturbance is handled by only one of the brake device and the steering device. However, because the braking force is applied to the vehicle in handling the disturbance by the brake device, it is anticipated that the vehicle considerably decelerates if the braking force is kept applied for a long time. On the other hand, in a case where the disturbance is handled by the steering device, it is anticipated that the driver feels unnatural or uncomfortable when a force is applied by the steering device to the steering operation member such as a steering wheel. It is thus desirable to take some measures in consideration of the above when the disturbance is handled by the brake device and the steering device.

(12) The disturbance handling system according to the form (11), wherein the disturbance handling portion is configured to determine a disturbance-handling braking force and to gradually decrease the disturbance-handling braking force with a lapse of time from a time point of the occurrence of the disturbance, the disturbance-handling braking force being a braking force that should be applied to the vehicle by the brake device to reduce the influence of the disturbance.

In the system according to this form, the disturbance-handling braking force is gradually decreased, thus preventing the vehicle from greatly decelerating when the disturbance is handled. The "disturbance-handling braking force" in this form not only means a force by which friction members (such as brake pads) are pushed onto a rotary body (such as a disc rotor) that rotate with the wheel, but also includes making a difference between the braking force applied to right wheels and the braking force applied to left wheels, for instance. Specifically, the disturbance-handling braking force is a concept widely including a force (moment) that causes a yawing motion of the vehicle by applying the braking force to only one of the right and left wheels for stopping rotation thereof, for instance. To "gradually decrease the disturbance-handling braking force with a lapse of time from a time point of the occurrence of the disturbance" not only means to gradually decrease the disturbance-handling braking force from the time point of the occurrence of the disturbance, but also means to gradually decrease the disturbance-handling braking force from some time after the time point of the occurrence of the disturbance.

(13) The disturbance handling system according to the form (12), wherein the disturbance handling portion is configured to determine a disturbance-handling steering force and to gradually increase the disturbance-handling steering force with a lapse of time from the time point of the occurrence of the disturbance, the disturbance-handling steering force being a steering force that should be applied to the vehicle by the steering device to reduce the influence of the disturbance.

According to this form, the disturbance-handling steering force can be increased after the time point of the occurrence of the disturbance without being generated at the time point of the occurrence of the disturbance. Owing to the thus generated disturbance-handling steering force, an abrupt motion of the steering operation member is obviated, thus reducing or avoiding the unnatural or uncomfortable feeling given to the driver when the disturbance is handled by the steering device. The "disturbance-handling steering force" not only means the steering force for steering the wheels, but also widely means a force (moment) that causes a yawing motion of the vehicle by steering the wheels in either the right or the left direction, for instance. To "gradually increase the disturbance-handling steering force with a lapse of time from a time point of the occurrence of the disturbance" not only means to gradually increase the disturbance-handling steering force from the time point of the occurrence of the disturbance, but also means to gradually increase the disturbance-handling steering force from some time after the time point of the occurrence of the disturbance. Further, a start time point of the gradual increase of the disturbance-handling steering force need not necessarily coincide with a start time point of the gradual decrease of the disturbance-handling braking force.

(14) The disturbance handling system according to the form (13), wherein the disturbance handling portion is configured to gradually decrease the disturbance-handling braking force in accordance with a gradual increase of the disturbance-handling steering force.

For instance, this form includes an arrangement in which at least a part of a time period during which the disturbance-handling steering force is gradually increasing overlaps at least a part of a time period during which the disturbance-handling braking force is gradually decreasing. This form enables handling of the disturbance to be smoothly shifted from handling by the braking force to handling by the steering force.

(15) The disturbance handling system according to the form (13) or (14), wherein a deviation of an actual yaw rate from a standard yaw rate is defined as a yaw rate deviation to indicate the degree of influence of the disturbance, the standard yaw rate being a yaw rate of the vehicle determined based on a steering operation, and wherein the disturbance handling portion is configured to determine the disturbance-handling braking force based on the yaw rate deviation and to determine the disturbance-handling steering force based on an integral value of the yaw rate deviation.

The yaw rate deviation is a parameter suitably indicative of the degree of influence of the disturbance. In this form, the disturbance is handled by both the disturbance-handling braking force and the disturbance-handling steering force according to a feedback control technique based on the parameter. Here, a term "handling force" is used as a superordinate concept of the disturbance-handling braking force and the disturbance-handling steering force. This form is for determining the handling force according to what is called a PI control. The disturbance handling-braking force is determined by a proportional term, and the disturbance-handling steering force is determined by an integral term. For instance, by gradually decreasing or increasing a gain of the proportional term, the disturbance-handling braking force (as the handling force) is gradually decreased or increased. By gradually decreasing or increasing a gain of the integral term, the disturbance-handling steering force (as the handling force) is gradually decreased or increased. The "steering operation" includes an operation amount of the steering operation member such as the steering wheel, the operation force applied to the steering operation member by the driver, an operation speed of the steering operation member operated by the driver, a steering amount of the wheels, a steering speed of the wheels, etc. It is generally preferable to employ the operation amount of the steering operation member.

(16) The disturbance handling system according to the form (15), wherein the disturbance handling portion is configured to control the steering device to generate the disturbance-handling steering force at a time point when the integral value of the yaw rate deviation exceeds a set value and to gradually increase the disturbance-handling steering force in accordance with an increase in the integral value of the yaw rate deviation starting from the time point.

According to this form, the disturbance-handling steering force can be generated after a lapse of a suitable time from the time point of the occurrence of the disturbance and can be gradually increased thereafter. Further, by gradually decreasing the disturbance-handling braking force in accordance with the increase of the integral value of the yaw rate deviation, the handling of the disturbance can be smoothly shifted from handling by the braking force to handling by the steering force, as in the preceding form.

(17) The disturbance handling system according to the form (11) or (12), wherein the disturbance handling portion is configured to control the steering device to handle the disturbance such that the steering device performs automatic steering of the vehicle so as to attain a standard running state that is a running state to be attained if the disturbance is not occurring.

Unlike the forms described above, this form does not determine the disturbance-handling steering force when the disturbance is handled by the steering device. According to this form, in a situation in which the disturbance is occurring, the steering device is directly controlled so as to attain a turning state (which is a concept including a straightforward running state) desired by the driver in a disturbance non-occurring state. In other words, this form may be a form in which the automatic steering is performed to attain the standard running state in the situation in which the disturbance is occurring. Various indices, such as a yaw rate that should be attained, a driving line on which the vehicle should travel, and a state of a surrounding view that should change, are employable as the "standard running state".

(18) The disturbance handling system according to the form (17), wherein the disturbance handling portion is configured to control the steering device to perform the automatic steering of the vehicle so as to attain the standard running state, based on information obtained by a camera provided on the vehicle to monitor a view ahead of the vehicle.

In this form, the state of the surrounding view that should change or the driving line on which the vehicle should travel is employed as an index of the standard running state (hereinafter referred to as "standard index" where appropriate). According to this form, the vehicle is automatically steered by the steering device based on a deviation of an actually changing state of the surrounding view or a driving line on which the vehicle is actually traveling, with respect to the standard index. In relation to the automatic steering, this form includes an arrangement in which the vehicle is automatically steered such that the vehicle travels middle between two opposite lane markers that demarcate a driving lane of the own vehicle and an arrangement in which the vehicle is automatically steered such that the vehicle crosses neither of the two lane markers.

(19) The disturbance handling system according to the form (17) or (18), wherein the disturbance handling portion is configured to limit a change gradient of a steering amount to be not larger than a set gradient in the automatic steering of the vehicle performed by the steering device to attain the standard running state.

This form is for preventing abrupt automatic steering when the disturbance is handled by the steering device. In other words, this form may be regarded as being equivalent to the forms explained above in which the disturbance-handling steering force is determined so as to gradually increase. Thus, this form enables the handling of the disturbance to be smoothly shifted from handling by the brake device to handling by the steering device. The "steering amount" is a concept that widely includes a change amount of an orientation of the vehicle itself, the steering amount (steering angle) of the wheels, the operation amount (operation angle) of the steering operation member, etc.

(21) The disturbance handling system according to any one of the forms (1) through (19), wherein, when a deviation of an actual yaw rate from a standard yaw rate is larger than a set threshold, the disturbance detecting portion determines that the disturbance is occurring and increases the set threshold in a situation in which the vehicle is being automatically steered, the standard yaw rate being a yaw rate of the vehicle determined based on a steering operation.

In this form and some of the following forms, the disturbance detecting portion is limited. The deviation of the actual yaw rate from the standard yaw rate (hereinafter referred to as "yaw rate deviation" where appropriate) is a parameter for suitably determining whether the disturbance that causes deflection of the vehicle is occurring. In a situation in which the automatic steering for prevention of driving lane departure is being performed as driving assistance, it is anticipated that the driver will perform a steering operation that counters the automatic steering. This steering operation will be referred to as a counter operation. In a case where the counter operation is performed, the determination based on the yaw rate deviation may cause a possibility that a behavior of the vehicle that results from the counter operation is determined to be due to a disturbance. That is, there is a possibility of erroneous determination as to the occurrence of the disturbance. According to this form, the set threshold is increased to eliminate the possibility of the erroneous determination in the situation in which the vehicle is being automatically steered.

(22) The disturbance handling system according to the form (21), wherein the disturbance detecting portion is configured to change the set threshold in accordance with a magnitude of a steering operation force such that the set threshold increases with an increase in the steering operation force, the steering operation force being an operation force applied by a driver to a steering operation member of a steering device of the vehicle.

The degree of the counter operation is generally indicated by the operation force applied to the steering operation member by the driver. (This operation force will be hereinafter referred to as "steering operation force" where appropriate). That is, as the counter operation becomes harder, the steering operation force becomes larger, so that the possibility of the erroneous determination becomes higher with an increase in the steering operation force. In this form, therefore, the set threshold is increased in accordance with the magnitude of the steering operation force that arises from the counter operation.

(23) The disturbance handling system according to the form (22), wherein the disturbance detecting portion is configured to determine the standard yaw rate based on the steering operation, and wherein the disturbance detecting portion is configured to estimate a variation amount of the steering operation that arises from the steering operation force and to determine a change amount of the set threshold based on the estimated variation amount of the steering operation.

This form includes limitation regarding to what extent the set threshold is to be changed. For instance, in a case where an ordinary steering device includes a steering shaft that rotates with the steering wheel, a gear mechanism for converting rotation of the steering shaft into a motion of a steering rod (such as a rack bar), and an assist device configured to assist steering of the wheels by the steering rod, the steering device is configured such that the steering operation force is detected by torsion of a torsion bar disposed between the steering shaft and the gear mechanism and the assist device assists steering of the wheels based on the detected steering operation force. In the thus configured steering device, the torsion amount of the torsion bar can be estimated as a variation amount of the steering operation that results from the counter operation. Thus, this form effectively prevents the erroneous determination as to the occurrence of the disturbance that arises from the counter operation from being made in the vehicle equipped with the ordinary steering device.

(24) The disturbance handling system according to the form (23), wherein the disturbance detecting portion is configured to estimate, based on the estimated variation amount of the steering operation, a variation amount of the yaw rate that will vary due to the variation amount of the steering operation and to determine the change amount of the set threshold based on the estimated variation amount of the yaw rate.

This form includes further limitation regarding to what extent the set threshold is to be changed. In determining the occurrence of the disturbance based on the yaw rate deviation described above, the yaw rate variation amount is estimated based on the variation amount of the steering operation, and the change amount of the set threshold is determined based on the yaw rate variation amount. This form more appropriately obviates the erroneous determination as to the occurrence of the disturbance that arises from the counter operation.

(25) The disturbance handling system according to the form (21), wherein the disturbance detecting portion changes the set threshold to a fixed value in a situation in which the vehicle is being automatically steered.

In this form, the set threshold is increased to a fixed value irrespective of the magnitude of the steering operation force in the situation in which the automatic steering is being performed, in contrast to the above-indicated forms in which the change amount of the set threshold is determined in accordance with the magnitude of the steering operation force. This form easily obviates, without relying on the degree of the counter operation, the erroneous determination as to the occurrence of the disturbance that arises from the counter operation.

(26) The disturbance handling system according to the form (25), wherein the set threshold is set in advance based on a variation amount of a steering operation, the variation amount arising from a steering operation force whose value is estimated to be maximum in the situation in which the vehicle is being automatically steered, the steering operation force being an operation force applied by a driver to a steering operation member of a steering device of the vehicle.

In this form, the set threshold is increased for preventing the erroneous determination that arises from the counter operation from being made even in a case where the counter operation that is estimated to be maximum is performed. Thus, the erroneous determination is prevented with high reliability in the situation in which the automatic steering is being performed.

(27) The disturbance handling system according to any one of the forms (21) through (26), wherein, when detecting the disturbance due to a crosswind, the disturbance detecting portion determines a first standard yaw rate as the standard yaw rate, also based on lateral acceleration that is being generated in the vehicle, and wherein, when a deviation of the first standard yaw rate from a second standard yaw rate that is another standard yaw rate determined not based on the lateral acceleration is equal in sign to a deviation of an actual yaw rate from the second standard yaw rate, the disturbance detecting portion determines that the disturbance due to the crosswind is not occurring, irrespective of a degree of a deviation of the actual yaw rate from the first standard yaw rate.

When the vehicle is traveling on a road inclined in the right-left direction (hereinafter referred to as "cant road" where appropriate), the vehicle receives a lateral force that arises from the gradient of the cant road, so that the vehicle is deflected by the lateral force. In handling the disturbance due to the crosswind, it is preferable to differentiate the deflection due to the lateral force from the deflection due to the crosswind. That is, by excluding the deflection that arises from the gradient of the road surface, the disturbance due to the crosswind can be accurately determined and the degree of influence of the disturbance due to the crosswind can be accurately grasped. Thus, this form enables appropriate determination of the disturbance due to the crosswind in consideration of the deflection of the vehicle that arises from the gradient of the road surface.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
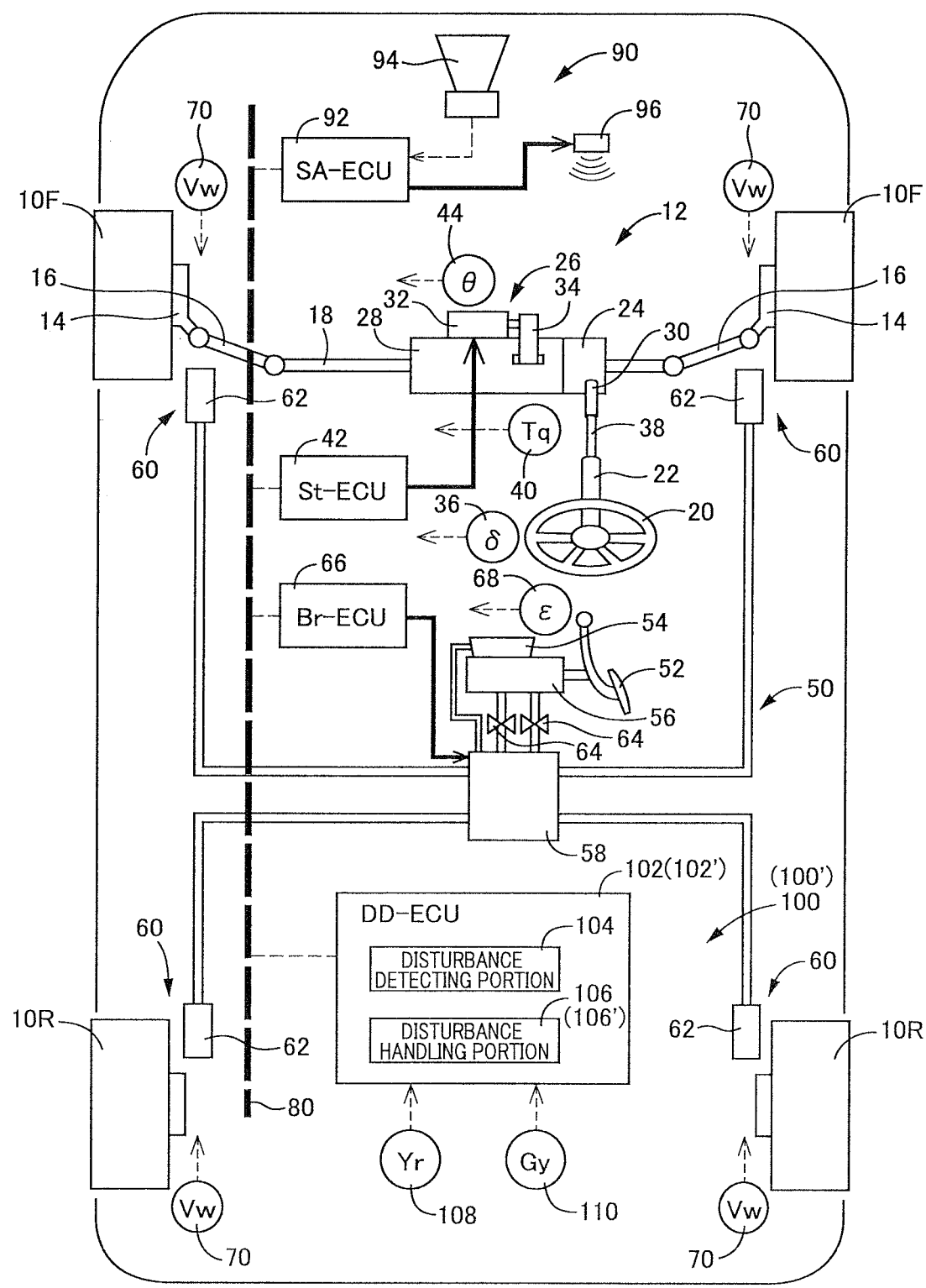
FIG. 1 is a schematic view illustrating a structure of a vehicle on which is installed a vehicle disturbance handling system according to a first embodiment.

Referring to the drawings, there will be explained below in detail a vehicle disturbance handling system (hereinafter simply referred to as "disturbance handling system" where appropriate) according to embodiments of the present disclosure. It is to be understood that the present disclosure is not limited to the details of the following embodiments but may be embodied based on the forms described in Various Forms and may be changed and modified based on the knowledge of those skilled in the art.

1. First Embodiment

A. Structure of Vehicle in Connection with Disturbance Handling

A vehicle disturbance handling system according to a first embodiment is for handling or coping with a crosswind that acts on a vehicle on which the present system is installed. In connection with handling of the crosswind, the vehicle has a structure schematically illustrated in FIG. 1. Referring to FIG. 1, the structure of the vehicle will be explained.

i) Steering Device

A vehicle on which the disturbance handling system is installed (hereinafter simply referred to as the vehicle or the present vehicle) has two front wheels 10F that are steerable wheels and two rear wheels 10R. The vehicle includes a steering device 12 for steering the two front wheels 10F. The front wheels 10F and/or the rear wheels 10R are drive wheels. The front wheels 10F and the rear wheels 10R will be collectively referred to as "wheels 10" where it is not necessary to distinguish the front wheels 10F and the rear wheels 10R from each other.

The steering device 12 includes: a pair of steering knuckles 14 that rotatably hold the corresponding front wheels 10F; a steering rod 18 whose opposite ends are coupled to the respective steering knuckles 14 via respective tie rods 16; a steering wheel 20 as a steering operation member; a steering shaft 22 that rotates with the steering wheel 20; a motion converting mechanism 24 configured to convert the rotating motion of the steering shaft 22 into a linear movement of the steering rod 18 in the right-left direction; and a steering actuator 26 configured to apply, to the steering rod 18, a force for moving the steering rod 18 in the right-left direction (hereinafter referred to as "moving force" where appropriate) or configured to move the steering rod 18 in the right-left direction.

Though illustration of an internal structure of the motion converting mechanism 24 is omitted, the motion converting mechanism 24 includes an input shaft 30 coupled to the steering shaft 22. A rack is formed on the steering rod 18, and a pinion is provided on the input shaft 30 so as to be held in engagement with the rack and so as to rotate with the input shaft 30. That is, the motion converting mechanism 24 is a rack-and-pinion mechanism. Though not illustrated, a thread groove is formed at a part of the steering rod 18, which part is located in a housing 28 of the steering actuator 26. A nut is disposed in the housing 28 so as to be threadedly engaged with the thread groove via bearing balls. A steering motor 32, which is an electric motor (brushless DC motor), is provided on the housing 28, and a timing belt 34 is looped over the nut and a motor shaft of the steering motor 32. When an electric current is supplied to the steering motor 32, the steering actuator 26 applies, to the steering rod 18, the moving force in the right-left direction that corresponds to the supplied current or the steering actuator 26 moves the steering rod 18 in the right-left direction.

The steering device 12 is provided with an operation angle sensor 36 for detecting a steering operation angle δ that is an operation amount of the steering wheel 20. The steering operation angle will be hereinafter simply referred to as "operation angle" where appropriate. The steering shaft 22 and the input shaft 30 of the motion converting mechanism 24 are coupled to each other via a torsion bar 38. The steering device 12 is provided with an operation force sensor 40 for detecting an amount of torsion of the torsion bar 38 caused by the steering operation by the driver, namely, for detecting an operation torque Tq as an operation force applied to the steering wheel 20 by the driver. This operation force will be hereinafter referred to as "steering operation force" where appropriate.

The steering device 12, namely, the steering motor 32 of the steering actuator 26, is controlled by a steering electronic control unit 42 constituted by a computer and an inverter as a driver of the steering motor 32. The steering electronic control unit 42 will be hereinafter referred to as "steering ECU 42". The present steering device 12 is a power steering device. Normally, a supply current to the steering motor 32 is controlled such that the steering actuator 26 applies the moving force to the steering rod 18 as a steering assist force, based on the operation torque Tq detected by the operation force sensor 40. The steering assist force is a force for assisting steering of the front wheels 10F.

As later explained in detail, control of the steering device 12 is executed in the present vehicle as driving assist for assisting the driver to prevent driving lane departure of the vehicle contrary to a driver's intention. This control is automatic steering control that may be referred to as lane keeping assist. Instead of the normal control described above, this automatic steering control is executed such that the moving force is applied to the steering rod 18 by the steering actuator 26 in a direction to prevent the vehicle from departing from the driving lane or such that steering of the front wheels 10F is performed so as to attain the steering amount determined to prevent the driving lane departure. In this respect, the steering amount means a steering angle of the front wheels 10F and is estimated based on a motor rotation angle θ detected by a motor rotation angle sensor 44 (such as a resolver) provided for the steering motor 32 for phase switching in electric current supply to the steering motor 32.

ii) Brake Device

A brake device 50 of the present vehicle is an ordinary hydraulic brake device. The brake device 50 includes: a brake pedal 52 as a brake operation member; a master cylinder 56 to which a reservoir 54 is attached and which is connected to the brake pedal 52; a brake actuator 58 connected to the master cylinder 56; and wheel brakes 60 provided for the respective wheels 10 and operable by a working fluid supplied from the brake actuator 58. Though illustration of an internal structure of the brake actuator 58 is omitted, the brake actuator 58 is constituted by a pump operable by a pump motor (that is an electric motor) and configured to pressurize the working fluid, an accumulator for storing the working fluid pressurized by the pump, electromagnetic valves for controlling the pressure of the working fluid supplied to the wheel brakes 60 of the respective wheels 10, etc. Each wheel brake 60 includes: a disc rotor that rotates with the corresponding wheel 10; and a brake caliper 62 including a wheel cylinder configured such that brake pads as friction members are pushed onto the disc rotor by the working fluid supplied thereto.

The present brake device 50 is a brake-by-wire brake device. In a normal condition, a master-cut valve 64 prohibits a flow of the working fluid between the master cylinder 56 and the brake actuator 58. In this state, the pump motor and the electromagnetic valves of the brake actuator 58 are controlled, so that a braking force desired by the driver is applied to the wheels 10.

The brake device 50 is controlled by a brake electronic control unit 66 constituted by a computer, drivers of the pump motor and the electromagnetic valves of the brake actuator 58, etc. The brake electronic control unit 66 will be hereinafter referred to as "brake ECU 66" where appropriate. The brake pedal 52 is provided with a stroke sensor 68 for detecting a pedal stroke 8. The stroke sensor 68, which is an operation amount sensor, detects the pedal strokes as a brake operation amount. The brake ECU 66 determines, based on the pedal stroke s detected by the stroke sensor 68, a target braking force that is the braking force desired by the driver, and controls the electromagnetic valves of the brake actuator 58 based on the target braking force, so as to control the braking force to be applied to each wheel 10 by the corresponding wheel brake 60.

The brake ECU 66 controls the brake device 50 such that the braking forces to be applied to the respective four wheels 10 can be controlled independently of each other. It is thus possible to make a difference between the braking force to be applied to the right wheels 10 and the braking force to be applied to the left wheels 10. Further, in a case where any of the wheels 10 lock, control is executable in which the braking force applied to the locked wheel/wheels 10 is canceled so as to cancel the locking, namely, anti-skid control (ABS control) is executable. In this respect, each wheel 10 is provided with a wheel speed sensor 70 for detecting a wheel rotational speed Vw of the corresponding wheel 10 for the purpose of detecting a running speed of the vehicle and determining whether the corresponding wheel 10 is locking. The wheel speed sensors 70 are connected to the brake ECU 66.

The present vehicle is equipped with a controllable area network or car area network (CAN) 80. The brake ECU 66 and the steering ECU 42 are both connected to the CAN 80 so as to communicable with each other. Other electronic control units that will be later explained are also connected to the CAN 80, and the electronic control units connected to the CAN 80 are communicable with each other.

iii) Steering Assist Device

The present vehicle is equipped with a steering assist device 90 configured to execute control for assisting driving by the driver, namely, automatic steering control that may be referred to as the lane keeping assist explained above. The control will be hereinafter referred to as "LKA control" where appropriate. For executing control processing of the LKA control, the steering assist device 90 includes: a steering assist electronic control unit 92 (hereinafter referred to as "steering assist ECU 92" where appropriate) that includes a computer as a main constituent element; a camera 94 for monitoring a view ahead of the vehicle; and a notifying device 96 configured to notify the driver that the own vehicle is departing from or is about to depart from the driving lane in which the own vehicle is traveling, by means of a speaker and an indicator.

The LKA control is known ordinary control, and its detailed explanation is dispensed with. In the LKA control, the steering assist ECU 92 identifies two lane markers that demarcate the driving lane in which the own vehicle is traveling, based on front-view image information obtained by the camera 94. When the steering assist ECU 92 judges that a possibility that the own vehicle will cross any of the two lane markers becomes high or judges that the vehicle has crossed any of the two lane markers, based on the front-view image information, the steering assist ECU 92 determines the moving force to be applied to the steering rod 18 by the steering actuator 26 or determines the steering amount of the front wheels 10F to be attained by the steering device 12, so as to steer the vehicle toward the middle of the driving lane.

The notifying device 96 is disposed in an instrument panel. The steering assist ECU 92 controls the notifying device 96 to notify the driver that the own vehicle is departing from or is about to depart from the driving lane. Further, the steering assist ECU 92 transmits information about the determined moving force or the determined steering amount to the steering ECU 42 via the CAN 80. When received the information, the steering ECU 42 controls, based on the information, the steering device 12, i.e., the steering actuator 26 of the steering device 12, so as to prevent the vehicle from departing from the driving lane.

B. Disturbance Handling System i) Outline of Disturbance Handling System

The crosswind that acts on the vehicle is a disturbance that causes deflection of the vehicle. Thus, the driving stability of the vehicle can be enhanced by detecting the deflection due to the crosswind and reducing the deflection. To this end, the present vehicle includes a disturbance handling system 100 for handling or coping with the crosswind that acts on the vehicle.

The disturbance handling system 100 includes, as its main element, a disturbance-handling electronic control unit 102 (hereinafter referred to as "disturbance handling ECU 102" where appropriate) including a computer as a main constituent element. The disturbance handling ECU 102 is configured such that the computer executes a disturbance handling program at a short time pitch. The disturbance handling ECU 102 includes a disturbance detecting portion 104 and a disturbance handling portion 106 each as a functional portion that work by execution of the program. The disturbance detecting portion 104 determines an occurrence of the crosswind as the disturbance and estimates a degree of influence of the crosswind. The disturbance handling portion 106 executes processing for handling the crosswind based on the estimated degree of influence of the crosswind.

There will be hereinafter explained in detail functions of the disturbance handling ECU 102, i.e., functions of the disturbance detecting portion 104 and the disturbance handling portion 106 while explaining a detecting process for detecting the crosswind and a handling process for handling the crosswind that are executed by the disturbance handling system 100. For handling the crosswind, the vehicle is equipped with: a yaw rate sensor 108 for detecting a yaw rate Yr when the vehicle is turning or being deflected; and a lateral acceleration sensor 110 for detecting lateral acceleration Gy of the vehicle that is being generated due to an inertial force in the lateral direction of the vehicle. It is noted that "turning of the vehicle" and "deflection of the vehicle" are the same phenomenon in behavior of the vehicle though there is a difference therebetween in terms of (i) the presence or absence of the driver's intension and (ii) a change rate of the orientation of the vehicle, for instance. Thus, in a case where the following explanation refers to one of "turning of the vehicle" and "deflection of the vehicle", the other of "turning of the vehicle" and "deflection of the vehicle" can be included.

ii) Detection of Crosswind

Figure 2:
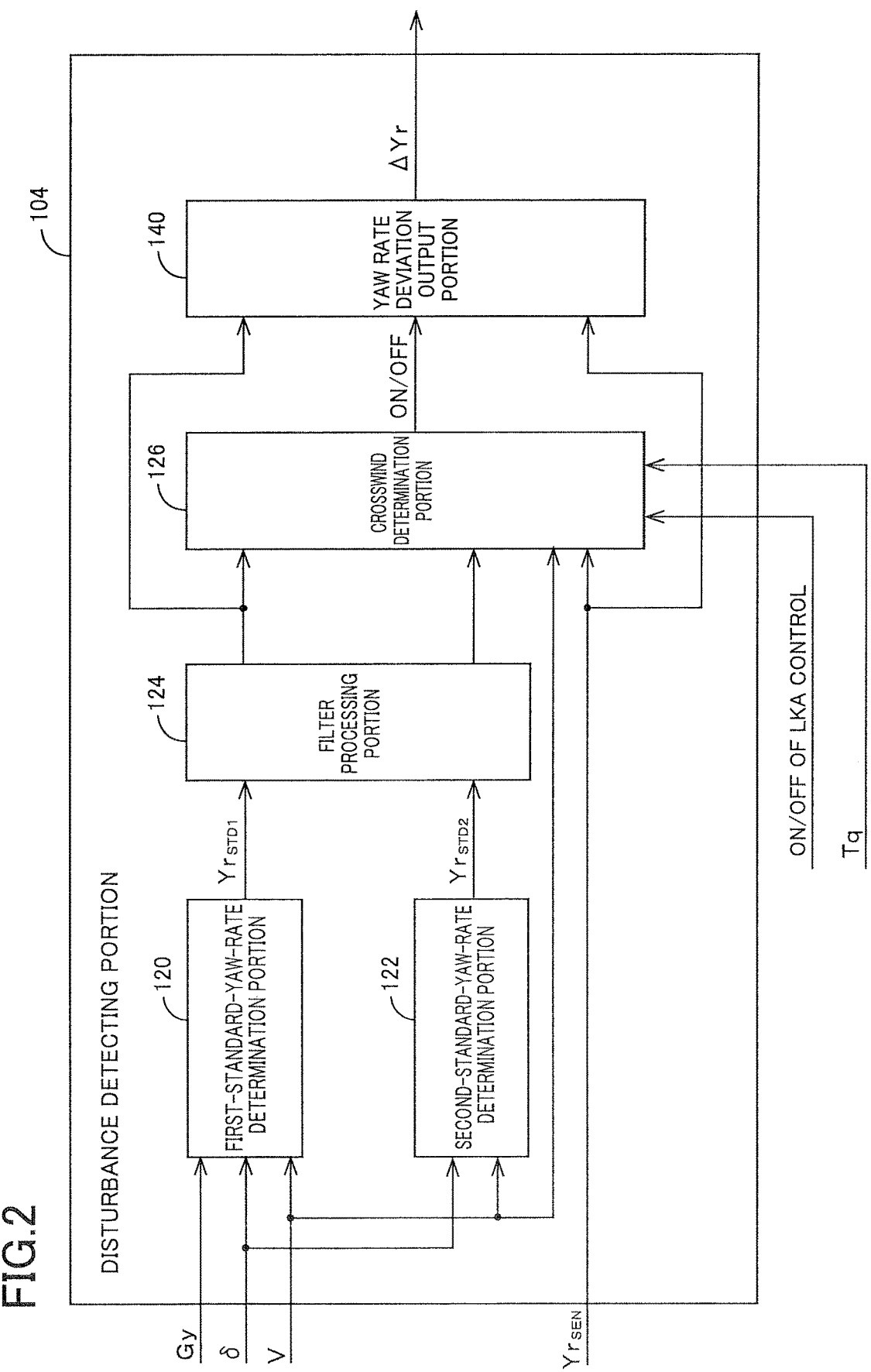
FIG. 2 is a block diagram illustrating functions of a disturbance detecting portion of a disturbance-handling electronic control unit of the disturbance handling system according to the first embodiment.

When the vehicle is deflected by the crosswind that acts thereon, an actual yaw rate $Yr_{SEN}$ that is a yaw rate Yr actually detected by the yaw rate sensor 108 differs from a standard yaw rate $Yr_{STD}$ that is a yaw rate Yr theoretically determined based on the steering operation angle δ, a vehicle running speed V, and so on. The disturbance handling system 100 determines, based on this phenomenon, whether the vehicle is being deflected due to the crosswind and estimates, as a degree of influence of the crosswind, a yaw rate deviation ΔYr that is a deviation of the actual yaw rate $Yr_{SEN}$ from the standard yaw rate $Yr_{STD}$. The disturbance detecting portion 104 for detecting the crosswind includes functional portions schematically illustrated in the block diagram of FIG. 2. Referring to FIG. 2, the process for detecting the crosswind will be explained.

In the following explanation, the steering operation angle δ is defined to be 0 when the steering wheel 20 is located at the neutral position (at which the steering wheel 20 is operated in neither right nor left). Further, the steering operation angle δ is defined to take a positive value when a steering operation to turn the vehicle to the left is being performed and is defined to take a negative value when a steering operation to turn the vehicle to the right is being performed. Similarly, the yaw rate Yr is defined to take a positive value when the vehicle is turning to the left (or when the vehicle is being deflected in the left direction) and is defined to take a negative value when the vehicle is turning to the right. Similarly, lateral acceleration Gy is defined to take a positive value when the inertial force in the right direction is acting on the vehicle body, namely, when the vehicle is turning to the left, and is defined to take a negative value when the inertial force in the left direction is acting on the vehicle body, namely, when the vehicle is turning to the right. Here, the inertial force is regarded as centrifugal force that acts on the vehicle body arising from the turning (deflection) of the vehicle.

As later explained in detail, the disturbance handling system 100 utilizes a first standard yaw rate $Yr_{STD1}$ and a second standard yaw rate $Yr_{STD2}$ each as the standard yaw rate $Yr_{STD}$ in order to exclude, from a target to be handled, deflection of the vehicle that arises from a road inclined in the right-left direction (hereinafter referred to as "cant road" where appropriate). The disturbance detecting portion 104 includes a first-standard-yaw-rate determination portion 120 for determining the first standard yaw rate $Yr_{STD1}$ and a second-standard-yaw-rate determination portion 122 for determining the second standard yaw rate $Yr_{STD2}$.

The first-standard-yaw-rate determination portion 120 determines the first standard yaw rate $Yr_{STD1}$ according to the following equation based on: the steering operation angle δ detected by the operation angle sensor 36; the lateral acceleration Gy detected by the lateral acceleration sensor 110; the vehicle running speed V that is determined by the brake ECU 66 based on the wheel rotational speeds Vw of the respective wheels 10 detected by the respective wheel speed sensors 70 and that is transmitted via the CAN 80; and a stability factor Kh, an overall steering gear ratio n, and a wheel base L that are stored in the disturbance handling ECU 102 as vehicle specifications of the present vehicle:

$$Yr_{STD1} = \frac{V \cdot \delta}{n \cdot L} - Gy \cdot V \cdot Kh \tag{1}$$

The second-standard-yaw-rate determination portion 122 determines the second standard yaw rate $Yr_{STD2}$ based on the steering operation angle δ and the vehicle running speed V according to the following equation:

$$Yr_{STD2} = \frac{V \cdot \delta}{n \cdot L} \cdot \frac{1}{1 + Kh \cdot V^2} \tag{2}$$

As apparent from the above two equations, the first standard yaw rate $Yr_{STD1}$ is determined in consideration of the detected lateral acceleration Gy whereas the second standard yaw rate $Yr_{STD2}$ is determined without considering the lateral acceleration Gy.

The filter processing portion 124 performs a low-pass filter processing on each of the determined first standard yaw rate $Yr_{STD1}$ and the second standard yaw rate $Yr_{STD2}$. The low-pass filter processing is a processing for compensating for a delay in time required for the steering operation to be reflected in the change of the actual yaw rate Yr. That is, the low-pass filter processing is a delay compensation processing that takes account of a delay of a vehicle behavior.

Figure 3A:
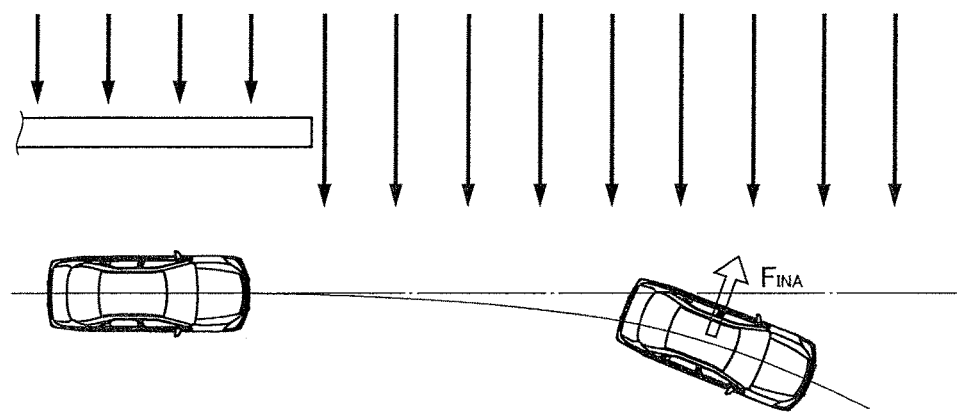
FIG. 3A is a view schematically illustrating a state in which the crosswind is acting on the vehicle running straightforward.

Here, the interrelationship among the first standard yaw rate $Yr_{STD1}$, the second standard yaw rate $Yr_{STD2}$, and the actual yaw rate $Yr_{SEN}$ will be explained. When the crosswind acts on the vehicle in a situation in which the vehicle is traveling straight without the steering wheel 20 being operated by the driver from the neutral position as illustrated in FIG. 3A, the first standard yaw rate $Yr_{STD1}$, the second standard yaw rate $Yr_{STD2}$, and the actual yaw rate $Yr_{SEN}$ change as indicated in a graph of FIG. 3B. Specifically, the second standard yaw rate $Yr_{STD2}$ remains "0" whereas the first standard yaw rate $Yr_{STD1}$ and the actual yaw rate $Yr_{SEN}$ take respective values opposite in sign because of the lateral acceleration Gy generated based on the inertial force (centrifugal force) $F_{INA}$ that arises from the deflection of the vehicle. In this respect, in a case where the steering wheel 20 is being operated, the second standard yaw rate $Yr_{STD2}$ is not "0" but takes a value corresponding to the steering operation angle δ, and the first standard yaw rate $Yr_{STD1}$ and the actual yaw rate $Yr_{SEN}$ take respective values that interpose the second standard yaw rate $Yr_{STD2}$ therebetween.

In view of the relationship described above, the crosswind determination portion 126 determines whether the crosswind that should be handled is acting on the vehicle based on: the first standard yaw rate $Yr_{STD1}$ and the second standard yaw rate $Yr_{STD2}$ that have been subjected to the delay compensation processing described above; and the actual yaw rate $Yr_{SEN}$. For convenience sake, this determination will be hereinafter referred to as "crosswind determination" where appropriate. The crosswind determination portion 126 has a functional configuration illustrated in a block diagram of FIG. 4. Specifically, it is needed to satisfy all of four conditions explained below to determine that the vehicle is receiving the crosswind that should be handled. The crosswind determination portion 126 includes four condition satisfaction determination portions 128-134 corresponding to the four conditions.

The first-condition satisfaction determination portion 128 determines whether a first condition represented by the following inequality is satisfied:

$$|Yr_{STD\,1} - Yr_{STD\,2}| > Yr_{TH\,1} \quad (3)$$

In a case where this condition is satisfied, it is estimated that the vehicle is receiving the force in the lateral direction. Specifically, when the crosswind acts on the vehicle in the situation in which the vehicle is traveling straight without the steering wheel 20 being operated by the driver, the second standard yaw rate $Yr_{STD2}$ is equal to "0" whereas the first standard yaw rate $Yr_{STD1}$ is not equal to "0". Thus, the fact that a difference between the first standard yaw rate $Yr_{STD1}$ and the second standard yaw rate $Yr_{STD2}$ is greater than a set first threshold $Yr_{TH1}$ is set as a necessary condition to determine that the crosswind that should be handled is occurring.

The second-condition satisfaction determination portion 130 determines whether a second condition represented by the following inequality is satisfied:

$$|Yr_{SEN} - Yr_{STD\,2}| > Yr_{TH\,2} \quad (4)$$

Also in a case where this condition is satisfied, it is estimated that the vehicle is receiving the force in the lateral direction. Specifically, when the crosswind acts on the vehicle in the situation in which the vehicle is traveling straight without the steering wheel 20 being operated by the driver, the second standard yaw rate $Yr_{STD2}$ is equal to "0" whereas the actual yaw rate $Yr_{SEN}$ somewhat deviates from the second standard yaw rate $Yr_{STD2}$. Thus, the fact that the deviation is greater than a set second threshold $Yr_{TH2}$ is set as a necessary condition to determine that the crosswind that should be handled is occurring.

The third-condition satisfaction determination portion 132 determines whether a third condition represented by the following inequality is satisfied:

$$|Yr_{SEN} - Yr_{STD1}| = |\Delta Yr| > Yr_{TH3} + A \quad (5)$$

This condition is a main condition in the crosswind determination. Here, a deviation of the actual yaw rate $Yr_{SEN}$ from the first standard yaw rate $Yr_{STD1}$ is defined as a main yaw rate deviation ΔYr for the crosswind determination. In this case, the yaw rate deviation ΔYr is regarded as a degree of influence of the disturbance, namely, a degree to which the vehicle is deflected due to the crosswind. The crosswind determination portion 126 determines that the third condition is satisfied in principle when the yaw rate deviation ΔYr, that is, an absolute value of the yaw rate deviation ΔYr in a strict sense, is greater than a set third threshold $Yr_{TH3}$.

Figure 3B:
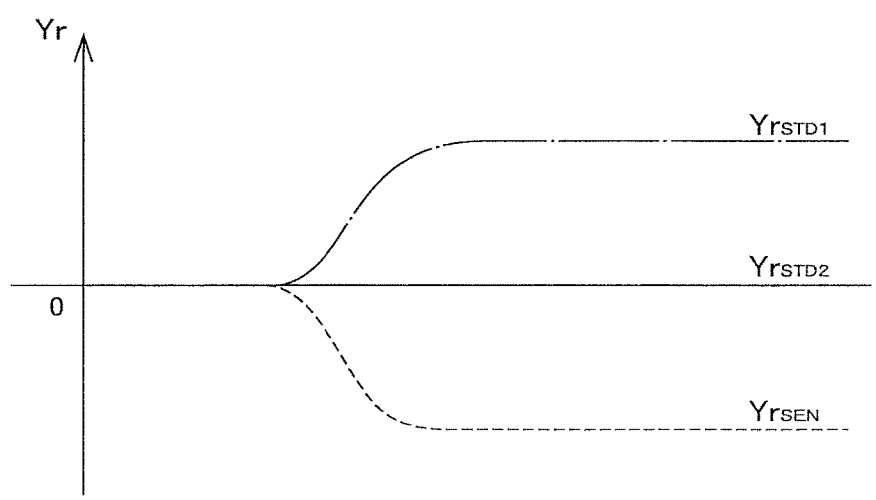
FIG. 3B is a graph showing a relationship between two standard yaw rates and an actual yaw rate in the state of FIG. 3A.

As mentioned above, the crosswind determination portion 126 determines that the third condition is satisfied in principle when the yaw rate deviation ΔYr is greater than the set third threshold $Yr_{TH3}$. In determining whether the third condition is satisfied, the threshold used for the determination is sometimes increased by adding, to the set third threshold $Yr_{TH3}$, an adjustment value A that is a positive value. Specifically, when the automatic steering is performed in a situation in which the LKA control is being executed, for instance, the steering device 12 receives a large steering operation force if the driver applies a force to the steering wheel 20 for maintaining a current operation angle δ of the steering wheel 20. That is, the torsion bar 38 is twisted by an amount corresponding to the operation torque Tq. As understood from the above equation, the first standard yaw rate $Yr_{STD1}$ is determined based on the steering operation angle δ. If the torsion bar 38 is twisted to a certain extent, there is generated a difference between the first standard yaw rate $Yr_{STD1}$ and the actual yaw rate $Yr_{SEN}$ as indicated in the graph of FIG. 3B, causing an increase in the yaw rate deviation ΔYr. This difference is referred to as "apparent deviation ΔYr'". In consideration of the apparent deviation ΔYr', the adjustment value A, which is determined to be equal to "0" when the LKA control, namely, the automatic steering control, is not being executed, is changed to a value except for "0" when the automatic steering control is being executed. That is, a dead zone in the determination is enlarged in the situation in which the automatic steering control is being executed, in order to avoid erroneous determination that there is an influence of the crosswind though in fact there is no influence of the crosswind, due to the phenomenon described above. In this respect, the adjustment value A is considered as a change amount of the set third threshold $Yr_{TH3}$.

The adjustment value A is determined by an adjustment value determination portion 136. Two determination processes, i.e., a first determination process and a second determination process, are set for determining the adjustment value A. The driver may select one of the two determination processes. Alternatively, one of the two determination processes may be set in advance by the manufacturer of the vehicle. Regardless of which one of the two processes is employed, the adjustment value determination portion 136 determines the adjustment value A to be equal to "0" in the situation in which the LKA control is not being executed, based on information as to whether the LKA control is being executed or not (ON/OFF), the information being sent from the steering assist ECU 92 via the CAN 80.

When the first determination process is employed in the situation in which the LKA control is being executed, the adjustment value determination portion 136 determines a torsion-dependent operation angle δ' that is the operation angle δ of the steering wheel 20 corresponding to the torsion amount of the torsion bar 38. The torsion-dependent operation angle δ' is determined based on the operation torque Tq detected by the operation force sensor 40 and pre-stored torsional stiffness σ of the torsion bar 38, according to the following equation. Here, the torsion-dependent operation angle δ' is considered as a variation amount of the steering operation that arises from the operation torque Tq as the steering operation force. The adjustment value determination portion 136 estimates the torsion-dependent operation angle δ'.

$$\delta' = \sigma \cdot Tq \qquad (6)$$

Based on the determined torsion-dependent operation angle δ', the apparent deviation ΔYr' is determined according to the following equation. The apparent deviation ΔYr' is considered as a variation amount of the yaw rate Yr that arises from the variation amount of the steering operation, namely, the apparent deviation ΔYr' is considered as the yaw rate variation amount. The adjustment value determination portion 136 estimates the yaw rate variation amount.

$$\Delta Yr' = \frac{V \cdot \delta'}{n \cdot L} \cdot \frac{1}{1 + Kh \cdot V^2} + \frac{V \cdot \delta'}{n \cdot L} \cdot \frac{1}{1 + Kh \cdot V^2} \cdot (Kh \cdot V^2) \qquad (7)$$

The first term in the above equation corresponds to a difference between the actual yaw rate $Yr_{SEN}$ and the second standard yaw rate $Yr_{STD2}$ indicated in the graph of FIG. 3B. The second term in the above equation corresponds to a difference between the first standard yaw rate $Yr_{STD1}$ and the second standard yaw rate $Yr_{STD2}$ indicated in the graph of FIG. 3B.

When the first determination process is employed, the adjustment value A is made equal to a value of the apparent deviation ΔYr' determined as described above. That is, the adjustment value determination portion 136 determines a change amount of the set third threshold $Yr_{TH3}$ that is the set threshold, based on the apparent deviation ΔYr' that is the yaw rate variation amount.

$$A = \Delta Yr' \qquad (8)$$

When the second determination process is employed, on the other hand, the adjustment value A is made equal to an expectable maximum deviation $\Delta Yr'_{MAX}$ set as a fixed value, irrespective of the value of the apparent deviation ΔYr'.

$$A = \Delta Yr'_{MAX} \qquad (9)$$

The expectable maximum deviation $\Delta Yr'_{MAX}$ is an apparent deviation ΔYr' estimated based on a maximum operation torque Tq that is anticipated to be detected in the LKA control. By employing the second determination process, the dead zone in the crosswind determination can be easily and reliably enlarged.

The fourth-condition satisfaction determination portion 134 determines whether the fourth condition represented by the following inequality is satisfied.

$$(Yr_{STD1} - Yr_{STD2}) \cdot (Yr_{SEN} - Yr_{STD2}) < 0 \qquad (10)$$

The fourth condition is a condition for excluding, from the disturbance to be handled, the deflection of the vehicle caused when the vehicle is traveling on the cant road.

Figure 5A:
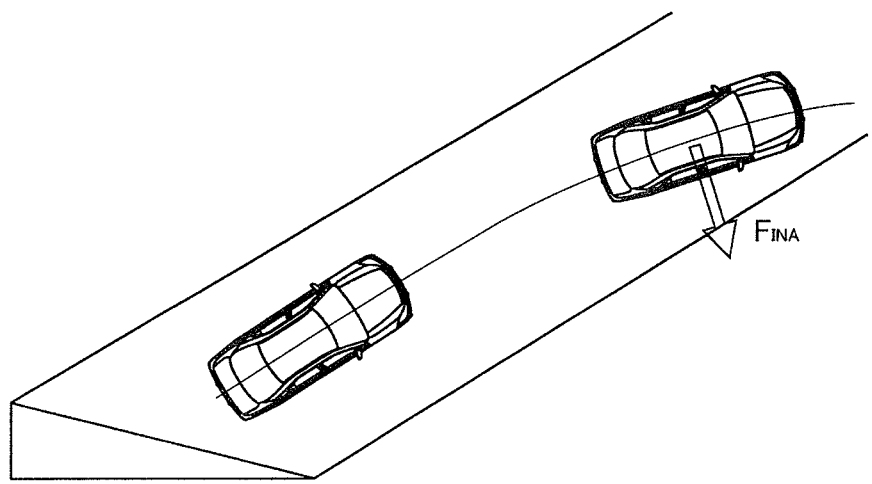
FIG. 5A is a view schematically illustrating a state in which the vehicle is traveling on a cant road.
Figure 5B:
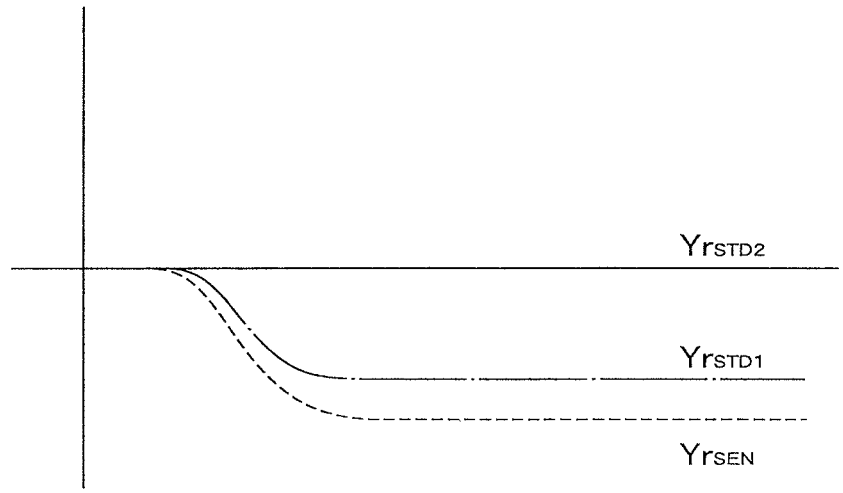
FIG. 5B is a graph showing a relationship between the two standard yaw rates and the actual yaw rate in the state of FIG. 5A.

In a situation in which the vehicle is traveling on the cant road as illustrated in FIG. 5A, inertial force $F_{INA}$ based on the gravity acts on the vehicle, so that the vehicle is deflected. This phenomenon is a natural phenomenon, and such deflection is a disturbance different in type from the crosswind to be handled. The fourth condition is set in consideration of this fact. When the vehicle enters the cant road without the steering wheel 20 being operated from the neutral position, the first standard yaw rate $Yr_{STD1}$, the second standard yaw rate $Yr_{STD2}$, and the actual yaw rate $Yr_{SEN}$ change as indicated in the graph of FIG. 5B. As apparent from comparison between FIG. 3A, FIG. 3B and FIGS. 5A, 5B, because of a difference in the direction in which the inertial force $F_{INA}$ acts, the first standard yaw rate $Yr_{STD1}$ in the graph of FIG. 5B is opposite in sign to the first standard yaw rate $Yr_{STD1}$ in the graph of FIG. 3B. That is, in this case, unlike the case in which the vehicle is deflected due to the crosswind, a deviation of the first standard yaw rate $Yr_{STD1}$ from the second standard yaw rate $Yr_{STD2}$ is equal in sign to a deviation of the actual yaw rate $Yr_{SEN}$ from the second standard yaw rate $Yr_{STD2}$. In consideration of this fact, the fourth-condition satisfaction determination portion 134 determines that the fourth condition is satisfied when those deviations are opposite in sigh to each other.

Figure 4:
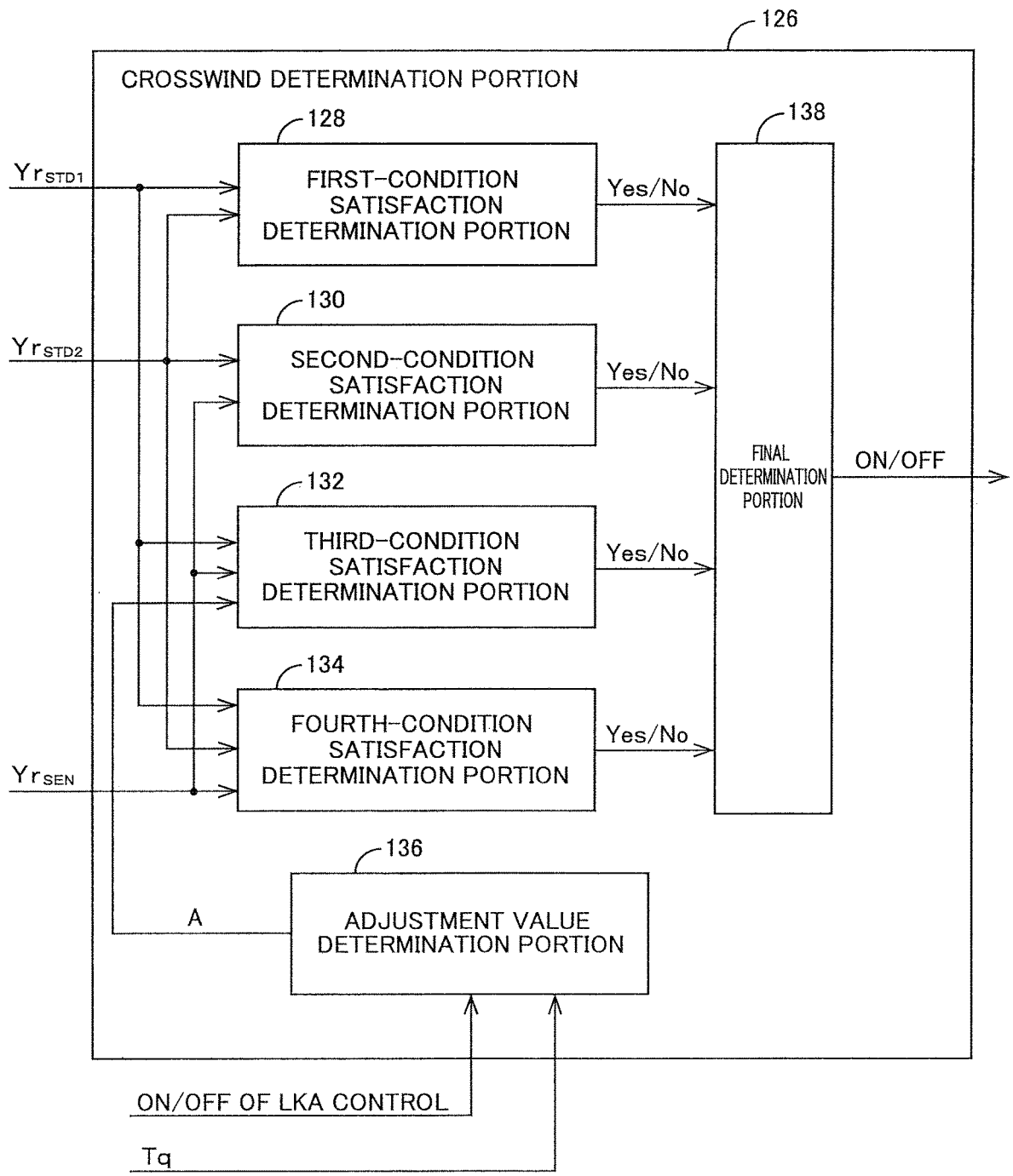
FIG. 4 is a block diagram illustrating functions of a crosswind determination portion of the disturbance detecting portion illustrated in FIG. 2.

The crosswind determination portion 126 includes a final determination portion 138 as illustrated in the block diagram of FIG. 4. The final determination portion 138 receives, from the first- through fourth-condition satisfaction determination portions 128-134, signals as to whether or not the first through fourth conditions are satisfied (Yes/No). The final determination portion 138 determines whether the vehicle is receiving the crosswind necessary to be handled, namely, determines the presence or absence of the crosswind (ON/OFF), based on whether all of the first through fourth conditions are satisfied, and outputs the determination result. In the present crosswind detecting process, it is determined that the disturbance due to the crosswind is not occurring when the fourth condition is not satisfied even if the third condition, as a main condition, is satisfied. That is, it is determined that the disturbance due to the crosswind is not occurring when the deviation of the actual yaw rate $Yr_{SEN}$ from the first standard yaw rate $Yr_{STD1}$ is equal in sign to the deviation of the actual yaw rate $Yr_{SEN}$ from the second standard yaw rate $Yr_{STD2}$, irrespective of the degree of the deviation of the actual yaw rate $Yr_{SEN}$ from the first standard yaw rate $Yr_{STD1}$.

The determination result as to the presence or absence of the crosswind made by the crosswind determination portion 126 is sent to a yaw rate deviation output portion 140 illustrated in FIG. 2. When the vehicle is receiving the crosswind necessary to be handled, the yaw rate deviation output portion 140 outputs, as the degree of influence of the crosswind, the yaw rate deviation ΔYr according to the following equation:

$$\Delta Yr = \Delta Yr_{SEN} - \Delta Yr_{STD1} \qquad (11)$$

When the vehicle is not receiving the crosswind necessary to be handled, on the other hand, the yaw rate deviation output portion 140 outputs the yaw rate deviation $\Delta Yr$ that is determined to be "0" according to the following equation:

$$\Delta Yr=0 \qquad (12)$$

As explained above, in the present process for detecting the crosswind disturbance, it is determined that the disturbance due to the crosswind is occurring when the yaw rate deviation $\Delta Yr$ (the deviation of the actual yaw rate $Yr_{SEN}$ from the first standard yaw rate $Yr_{STD1}$ as the standard yaw rate $Yr_{STD}$ that is the yaw rate Yr of the vehicle determined based on the steering operation) is greater than the set threshold (i.e., the set third threshold $Yr_{TH3}$). Further, the set threshold is increased in the situation in which the vehicle is being automatically steered. Thus, in the case where the driver performs the steering operation that counters or opposes the automatic steering, the present process obviates a possibility that the behavior of the vehicle resulting from such steering operation is determined to be due to the disturbance. In other words, the present process eliminates a possibility of erroneous determination as to the occurrence of the disturbance.

iii) Process for Handling Crosswind

Figure 6:
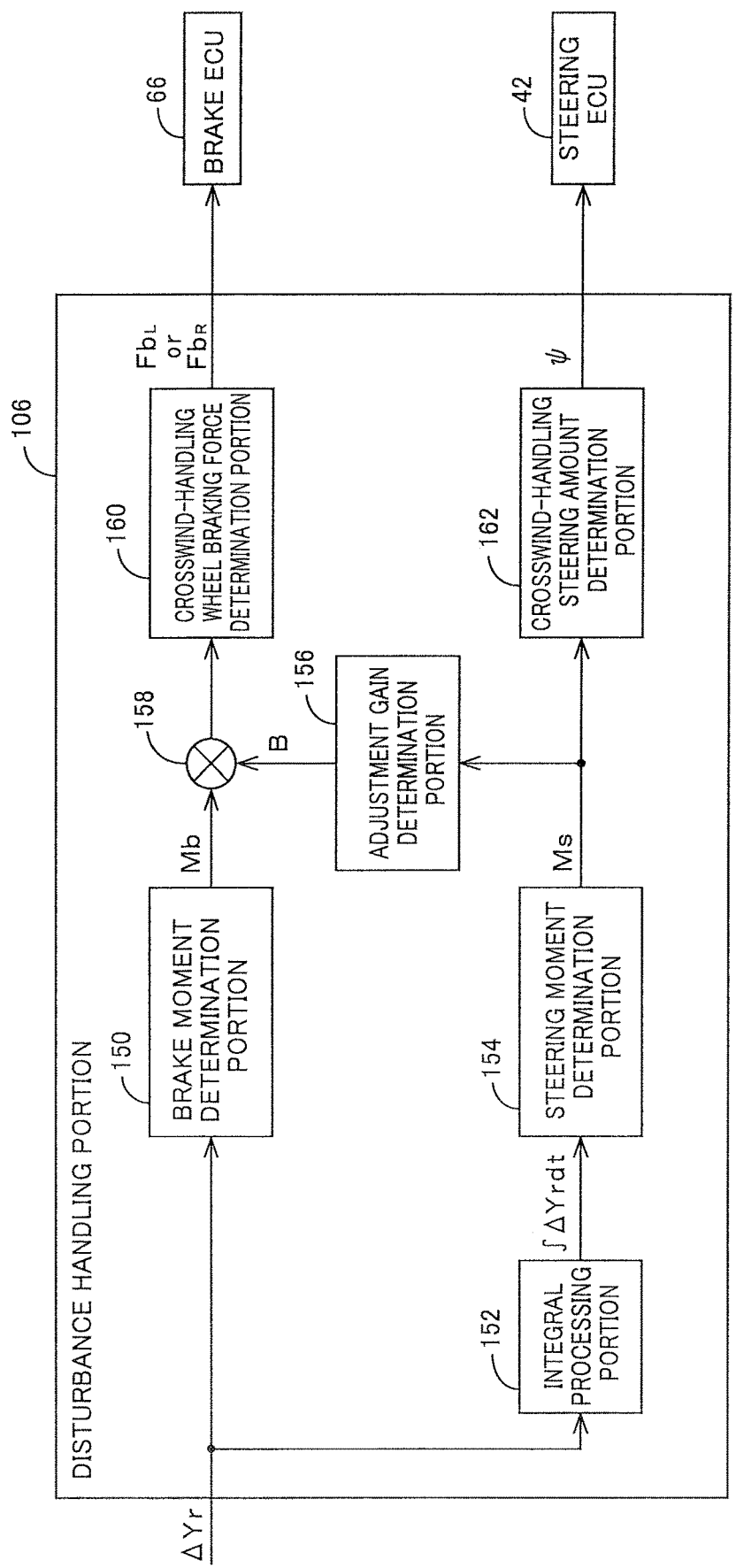
FIG. 6 is a block diagram illustrating functions of a disturbance handling portion of the disturbance-handling electronic control unit of the disturbance handling system according to the first embodiment.

The deflection of the vehicle due to the crosswind adversely influences driving stability and driving comfortability of the vehicle, for instance. It is thus desirable that the deflection due to the crosswind be reduced. In the disturbance handling system 100, the deflection of the vehicle due to the crosswind is handled by both the brake device 50 and the steering device 12. The crosswind is handled by the disturbance handling portion 106 of the disturbance handling ECU 102 illustrated in FIG. 1. The disturbance handling portion 106 includes functional portions schematically shown in a block diagram of FIG. 6. Referring to FIG. 6, a process for handling the crosswind will be explained.

The disturbance handling portion 106 includes a brake moment determination portion 150, an integral processing portion 152, and a steering moment determination portion 154. The yaw rate deviation $\Delta Yr$ transmitted as the degree of influence of the crosswind from the disturbance detecting portion 104 is input to the brake moment determination portion 150 and the integral processing portion 152. The integral processing portion 152 executes an integral processing of the yaw rate deviation $\Delta Yr$ from a time point of the occurrence of the crosswind to be handled, namely, from a time point when the yaw rate deviation $\Delta Yr$ transmitted from the disturbance detecting portion 104 is no longer equal to "0". Here, a value obtained by the integral processing is represented as a yaw rate deviation integral value $\int \Delta Yrdt$. The integral processing portion 152 outputs the yaw rate deviation integral value $\int \Delta Yrdt$ to the steering moment determination portion 154. In this respect, the integral processing portion 152 resets the yaw rate deviation integral value $\int \Delta Yrdt$ to "0" at a time point when the yaw rate deviation $\Delta Yr$ transmitted from the disturbance detecting portion 104 becomes equal to "0".

Figure 7C:
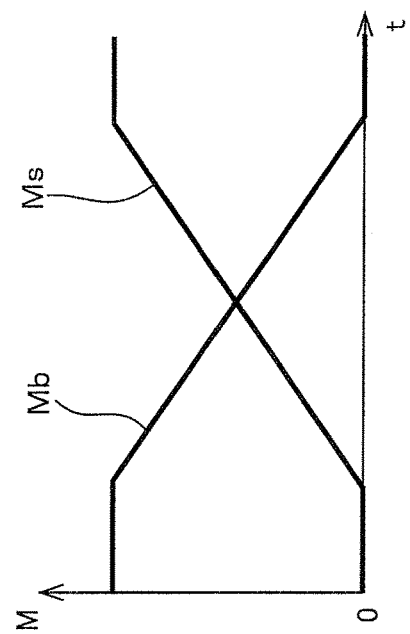
FIG. 7C is a graph showing an adjustment gain determined by the disturbance handling portion.

The brake moment determination portion 150 determines, based on the yaw rate deviation $\Delta Yr$, a brake counter moment Mb that is a counter yaw moment M that should be applied to the vehicle by the braking force of the brake device 50 to decrease the yaw rate deviation $\Delta Yr$, in other words, to counter the crosswind. The disturbance handling ECU 102 stores map data shown in a graph of FIG. 7A. Specifically, the disturbance handling ECU 102 stores data of the brake counter moment Mb with respect to the yaw rate deviation $\Delta Yr$. Referring to the stored map data, the brake moment determination portion 150 determines the brake counter moment Mb as follows. The brake counter moment Mb is applied to the vehicle when the yaw rate deviation $\Delta Yr$, i.e., the absolute value of the yaw rate deviation $\Delta Yr$ in a strict sense, increases to a certain extent. The brake counter moment Mb increases with an increase in the yaw rate deviation $\Delta Yr$. When the yaw rate deviation $\Delta Yr$ further increases to a certain extent, the brake counter moment Mb kept at a constant level is applied. The brake counter moment Mb is considered as a disturbance-handling braking force that is a braking force to be applied to the vehicle by the brake device 50 to reduce the influence of the disturbance.

The steering moment determination portion 154 determines, based on the yaw rate deviation integral value $\int \Delta Yrdt$, a steering counter moment Ms that is a counter yaw moment M that should be applied to the vehicle in dependence on steering of the front wheels 10F by the steering device 12 to decrease the yaw rate deviation $\Delta Yr$, in other words, to counter the crosswind. The disturbance handling ECU 102 stores map data shown in a graph of FIG. 7B. Specifically, the disturbance handling ECU 102 stores data of the steering counter moment Ms with respect to the yaw rate deviation integral value $\int \Delta Yrdt$. Referring to the stored map data, the steering moment determination portion 154 determines the steering counter moment Ms as follows. The steering counter moment Ms is applied to the vehicle when the yaw rate deviation integral value $\int \Delta Yrdt$, i.e., the absolute value of the yaw rate deviation integral value $\int \Delta Yrdt$ in a strict sense, increases to a certain extent. The steering counter moment Ms increases with an increase in the yaw rate deviation integral value $\int \Delta Yrdt$. When the yaw rate deviation integral value $\int \Delta Yrdt$ further increases to a certain extent, the steering counter moment Ms kept at a constant level is applied. The steering counter moment Ms is considered as a disturbance-handling steering force that is a steering force to be applied to the vehicle by the steering device 12 to reduce the influence of the disturbance.

The disturbance handling portion 106 utilizes an adjustment gain B for the brake counter moment Mb to decrease the brake counter moment Mb with an increase in the steering counter moment Ms. To this end, the disturbance handling portion 106 includes an adjustment gain determination portion 156 for determining the adjustment gain B. The disturbance handling ECU 102 stores map data relating to the adjustment gain B for gradually decreasing the brake counter moment Mb. Specifically, the disturbance handling ECU 102 stores data shown in a graph of FIG. 7C for determining the adjustment gain B such that the adjustment gain B decreases from "1" in accordance with an increase in the steering counter moment Ms and such that the adjustment gain B becomes equal to "0" when the steering counter moment Ms increases to a certain extent or more. Referring to the map data, the adjustment gain determination portion 156 determines the adjustment gain B.

The brake counter moment Mb determined by the brake moment determination portion 150 is adjusted by an adjusting portion 158 in accordance with the adjustment gain B determined by the adjustment gain determination portion 156. That is, the brake counter moment Mb is multiplied by the adjustment gain B.

The thus adjusted brake counter moment Mb is transmitted to a crosswind-handling wheel braking force determination portion 160. The crosswind-handling wheel braking force determination portion 160 determines, based on the brake counter moment Mb, the braking forces to be applied by the brake device 50 to the right and left wheels 10 for reducing the deflection of the vehicle due to the crosswind. Specifically, to suppress the deflection of the vehicle due to the crosswind, the crosswind-handling wheel braking force determination portion 160 determines a crosswind-handling left wheel braking force $Fb_L$ that is the braking force to be applied to the left wheels 10 or a crosswind-handling right wheel braking force $Fb_R$ that is the braking force to be applied to the right wheels 10. The process for determining those braking forces is known in the art, and its explanation is dispensed with. Information on the crosswind-handling left wheel braking force $Fb_L$ or the crosswind-handling right wheel braking force $Fb_R$ determined as described above is transmitted to the brake ECU 66 of the brake device 50 via the CAN 80. The brake ECU 66 controls the brake device 50 based on the crosswind-handling left wheel braking force $Fb_L$ or the crosswind-handling right wheel braking force $Fb_R$. As a result, the braking force based on the braking force $Fb_L$ is applied to the left wheels 10 or the braking force based on the braking force $Fb_R$ is applied to the right wheels 10. Alternatively, in a situation in which the braking force based on the brake operation of the driver is already being applied to the wheels 10 at this point in time, the braking force $Fb_L$ is added to the left wheels 10 or the braking force $Fb_R$ is added to the right wheels 10.

The steering counter moment Ms determined by the steering moment determination portion 154 is transmitted to a crosswind-handling steering amount determination portion 162. The crosswind-handling steering amount determination portion 162 determines, based on the steering counter moment Ms, a steering amount of the front wheels 10F to be steered by the steering device 12, namely, a crosswind-handling steering amount $\psi$, for reducing the deflection of the vehicle due to the crosswind. The process for determining the crosswind-handling steering amount is known in the art, and its explanation is dispensed with. Information on the determined crosswind-handling steering amount $\psi$ is transmitted to the steering ECU 42 of the steering device 12 via the CAN 80. The steering ECU 42 controls the steering device 12 based on the crosswind-handling steering amount $\psi$. As a result, the front wheels 10F are steered by the steering amount corresponding to the crosswind-handling steering amount $\psi$. Alternatively, in a situation in which the front wheels 10F are already being steered, the steering amount of the front wheels 10F is changed in accordance with the crosswind-handling steering amount $\psi$. In this respect, the crosswind-handling steering amount $\psi$ is determined to be a positive value for causing deflection of the vehicle in the left direction while the crosswind-handling steering amount $\psi$ is determined to be a negative value for causing deflection of the vehicle in the right direction.

Figure 7D:
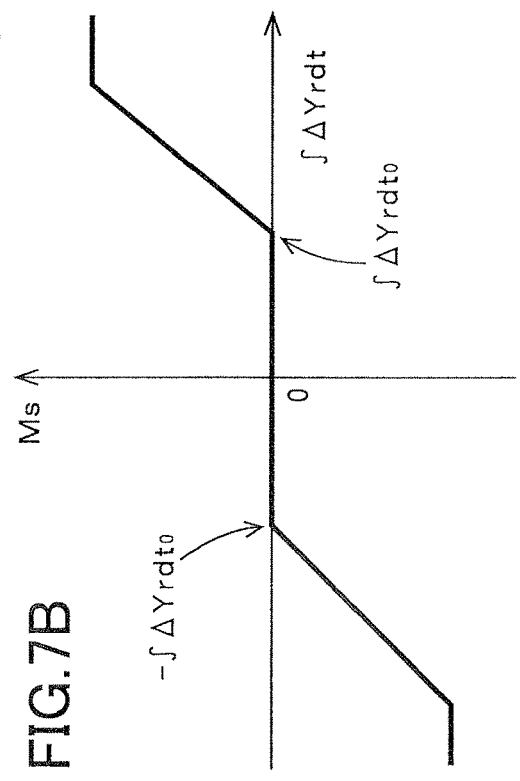
FIG. 7D is a graph showing temporal changes of the determined disturbance-handling braking force and the determined disturbance-handling steering force.
Figure 7A:
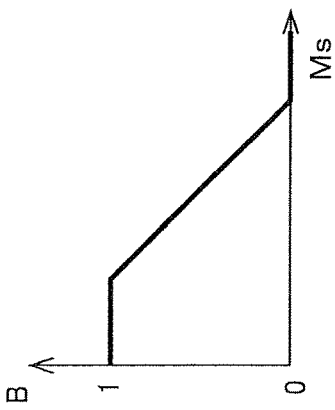
FIG. 7A is a graph showing a disturbance-handling braking force determined by the disturbance handling portion.

In the present process for handling the crosswind, the brake counter moment Mb as the disturbance-handling braking force and the steering counter moment Ms as the disturbance-handling steering force change with a time t that elapses from the time point of the occurrence of the crosswind to be handled, as schematically shown in a graph of FIG. 7D. Specifically, a relatively large value of the brake counter moment Mb is applied from immediately after the time point of the occurrence of the crosswind disturbance. Thereafter, the brake counter moment Mb is gradually decreased and finally made equal to "0". In contrast, the steering counter moment Ms is made equal to "0" immediately after the time point of the occurrence of the crosswind disturbance and gradually increased thereafter. Finally, a relatively large value of the steering counter moment Ms is applied. In the present process, therefore, the brake counter moment Mb is gradually decreased, so that the vehicle is prevented from greatly decelerating when the crosswind disturbance is handled. Further, the steering counter moment Ms, which is not yet generated at the time point of the occurrence of the crosswind disturbance, is gradually increased thereafter. This obviates a phenomenon in which the steering wheel 20 moves abruptly, thus reducing or avoiding an unnatural feeling felt by the driver.

Figure 7B:
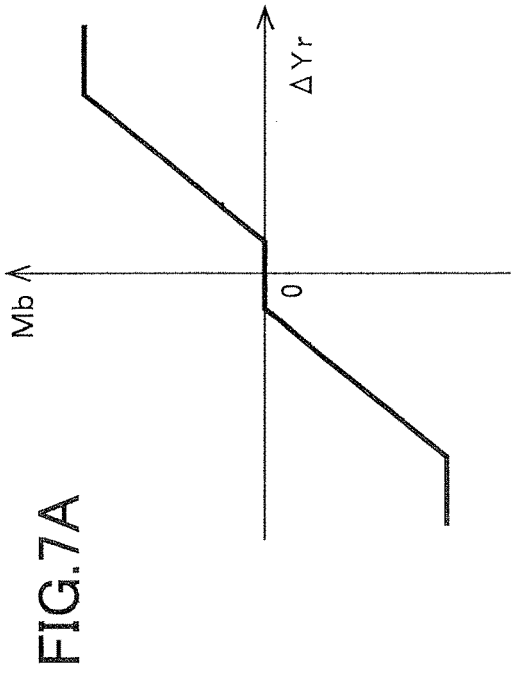
FIG. 7B is a graph showing a disturbance-handling steering force determined by the disturbance handling portion.

As apparent from the graph of FIG. 7D, the brake counter moment Mb is gradually decreased in accordance with the gradual increase of the steering counter moment Ms. Accordingly, this configuration enables the handling of the crosswind disturbance to be smoothly shifted from handling by the braking force to handling by the steering force, in other words, to be smoothly shifted from handling by the brake device 50 to handling by the steering device 12. Specifically, the steering counter moment Ms is generated at a time point when the yaw rate deviation integral value $\int \Delta Yr dt$ exceeds a set value $\pm \int \Delta Yr dt_0$ as shown in the graph of FIG. 7B.

iv) Flow of Processes

The computer of the disturbance handling ECU 102 executes a disturbance handling program at a short time pitch, e.g., about several to several tens of milliseconds (msec), so that the detecting process for detecting the crosswind disturbance and the handling process for handling the crosswind disturbance are executed. The disturbance handling program is indicated by a flowchart of FIG. 8. Referring to the flowchart, the detecting process and the handling process will be briefly explained.

In the disturbance handling program, the first standard yaw rate $Yr_{STD1}$ is determined at Step 1 according to the technique explained above. (Hereinafter, Step 1 is abbreviated as "S1", and other steps are similarly abbreviated.) At S2, the second standard yaw rate $Yr_{STD2}$ is determined according to the technique explained above. At S3, the filter processing of the first standard yaw rate $Yr_{STD1}$ and the second standard yaw rate $Yr_{STD2}$ is executed as described above.

In the disturbance handling system 100, the adjustment value A is used in determining whether the third condition for the crosswind determination is satisfied, in consideration of the situation in which the automatic steering control is already being performed. In this case, it is needed to select, as the adjustment value A, one of the apparent deviation $\Delta Yr'$ that depends on the operation torque Tq and the expectable maximum deviation $\Delta Yr'_{MAX}$ that is a fixed value. For this selection, an adjustment value selection flag FA is used. The flag value of the adjustment value selection flag FA is set to "1" when the apparent deviation $\Delta Yr'$ is selected by the driver or the manufacturer of the vehicle while the flag value is set to "0" when the expectable maximum deviation $\Delta Yr_{MAX}$ is selected by the driver or the manufacturer. At S4, the flag value of the adjustment value selection flag FA is judged. When the flag value is "1", the control flow goes to S5 at which the apparent deviation $\Delta Yr'$ is calculated according to the process described above and the adjustment value A is determined to be equal to the apparent deviation $\Delta Yr'$. When the flag value is "0", the control flow goes to S6 at which the adjustment value A is determined to be equal to the expectable maximum deviation $\Delta Yr'_{MAX}$.

At S7, it is determined whether the first through fourth conditions for the crosswind determination are satisfied. In the situation in which the LKA control is being executed, the adjustment value A determined as described above is used in determining whether the third condition is satisfied. When all of the first through fourth conditions are satisfied, it is determined at S8 that the crosswind that should be handled is occurring.

When the vehicle is receiving the crosswind that should be handled, the yaw rate deviation $\Delta Yr$ as a parameter indicative of the degree of influence of the crosswind is identified at S9 according to the technique described above. At S10, the integral processing is performed on the identified yaw rate deviation $\Delta Yr$. At S11, the brake counter moment Mb as the disturbance-handling braking force is determined referring to the map data shown in FIG. 7A based on the yaw rate deviation $\Delta Yr$. At S12, the steering counter moment Ms as the disturbance-handling steering force is determined referring to the map data shown in FIG. 7B based on the yaw rate deviation integral value $\int\Delta Yr dt$ obtained by the integral processing of the yaw rate deviation $\Delta Yr$.

After the brake counter moment Mb and the steering counter moment Ms are determined, the control flow goes to S13 at which the adjustment gain B used for gradually decreasing the brake counter moment Mb is determined referring to the map data shown in FIG. 7C based on the yaw rate deviation integral value $\int\Delta Yr dt$. At S14, the brake counter moment Mb is adjusted based on the determined adjustment gain B. At S15, based on the adjusted brake counter moment Mb, the crosswind-handling left wheel braking force $Fb_L$ or the crosswind-handling right wheel braking force $Fb_R$ is determined. The crosswind-handling left wheel braking force $Fb_L$ or the crosswind-handling right wheel braking force $Fb_R$ determined at S15 is sent to the brake ECU 66. At S16, the crosswind-handling steering amount $\psi$ is determined based on the steering counter moment Ms. The determined crosswind-handling steering amount it is sent to the steering ECU 42.

One execution of the disturbance handling program ends after execution of a series of processing described above. In this respect, when it is determined at S8 that the crosswind to be handled is not occurring, namely, when at least one of the first through fourth conditions is not satisfied, one execution of the disturbance handling program ends without S9 and steps thereafter being implemented As explained above, the disturbance handling ECU 102 is configured such that the computer executes a series of processing described above by executing the disturbance handling program. The disturbance handling system 100, i.e., the disturbance handling ECU 102, may include a dedicated circuit for executing a part of or an entirety of a series of processing described above, in place of the computer.

Second Embodiment

A vehicle disturbance handling system (hereinafter simply referred to as "disturbance handling system" where appropriate) according to a second embodiment differs from the disturbance handling system 100 according to the first embodiment only in the process for handling the crosswind disturbance. Accordingly, the disturbance handling system of the second embodiment and a disturbance handling ECU in the system of the second embodiment will be respectively referred to as a disturbance handling system 100' and a disturbance handling ECU 102' as shown bracketed in FIG. 1. Further, a disturbance handling portion of the present disturbance handling system will be referred to as a disturbance handling portion 106' as shown bracketed in FIG. 1. The disturbance handling system 100' of the second embodiment will be explained focusing only on the disturbance handling portion 106'. Reference numerals as used for the functional portions of the disturbance handling portion 106 are used to identify functional portions of the disturbance handling portion 106' having the same functions. Further, the functional portions of the disturbance handling portion 106' that are similar in function to those of the disturbance handling portion 106 are indicated by attaching a prime symbol (') to reference numerals indicating the functional portions of the disturbance handling portion 106.

Figure 9:
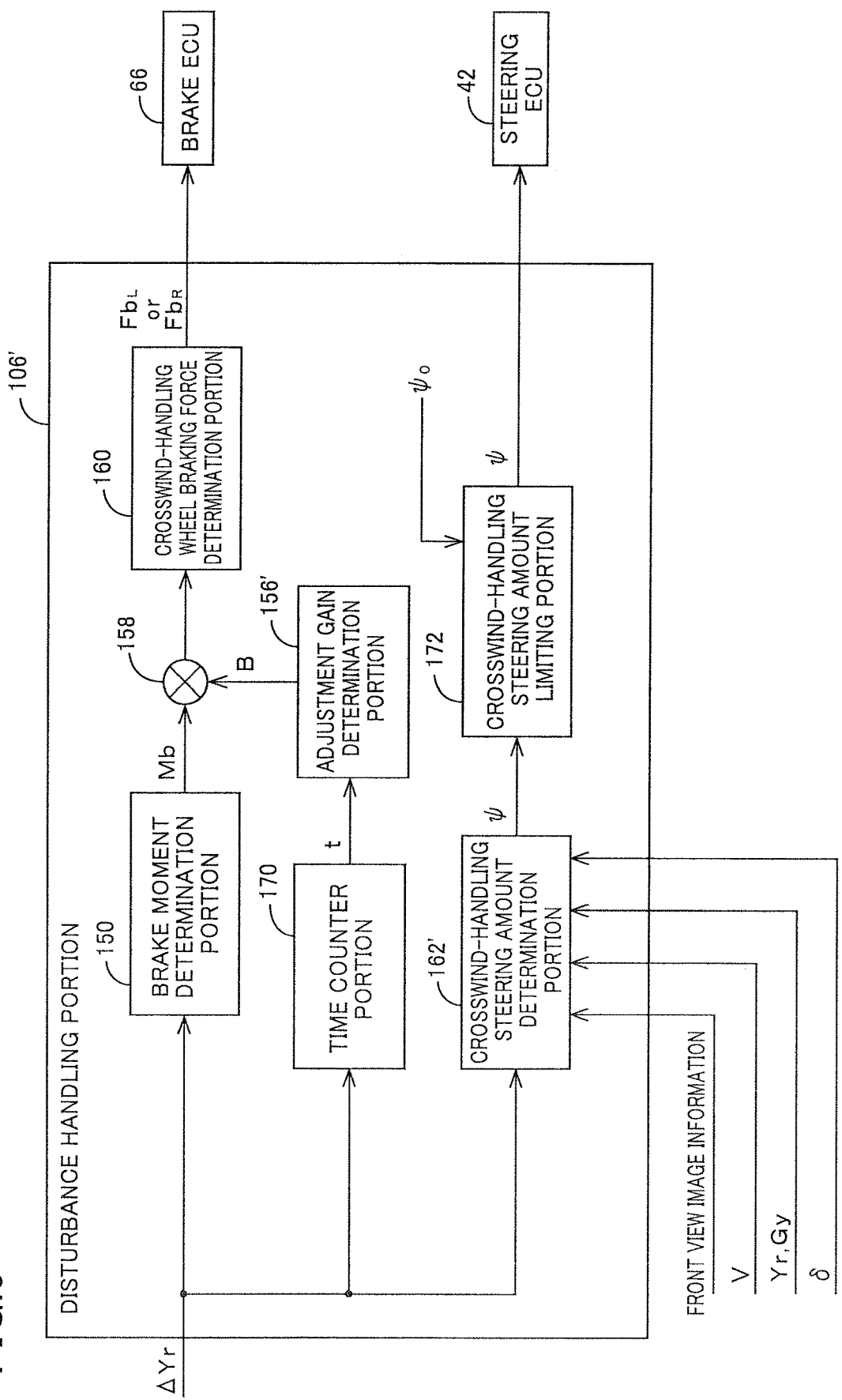
FIG. 9 is a block diagram illustrating functions of a disturbance handling portion of a disturbance-handling electronic control unit of a vehicle disturbance handling system according to a second embodiment.

The difference between the disturbance handling portion 106' of the second embodiment and the disturbance handling portion 106 of the first embodiment is as follows. In the disturbance handling system 100 of the first embodiment, the crosswind-handling steering amount $\psi$ as the steering amount of the front wheels 10F for handling the crosswind disturbance is determined based on the yaw rate deviation $\Delta Yr$ as the parameter indicative of the degree of influence of the crosswind disturbance, namely, based on the yaw rate deviation integral value $\int\Delta Yr dt$ that is an integral value of the yaw rate deviation $\Delta Yr$. Further, the steering device 12 is controlled based on the crosswind-handling steering amount $\psi$, so that the crosswind disturbance is handled by the steering device 12. In the disturbance handling system 100' of the second embodiment, in contrast, the vehicle is automatically steered by the steering device 12 to attain a standard running state that is a running state of the vehicle that should be attained unless the disturbance occurs, in other words, unless the vehicle is receiving the crosswind. Specifically, a driving line on which the vehicle should drive is identified as an index of the standard running state. This driving line will be referred to as "standard driving line" where appropriate. When the crosswind that should be handled is occurring, the vehicle is automatically steered so as to drive on the standard driving line, so that the crosswind disturbance is handled by the steering device 12. Referring to a block diagram of FIG. 9, there will be explained in detail the functional portions of the disturbance handling portion 106' and a process for handling the crosswind.

Figure 10A:
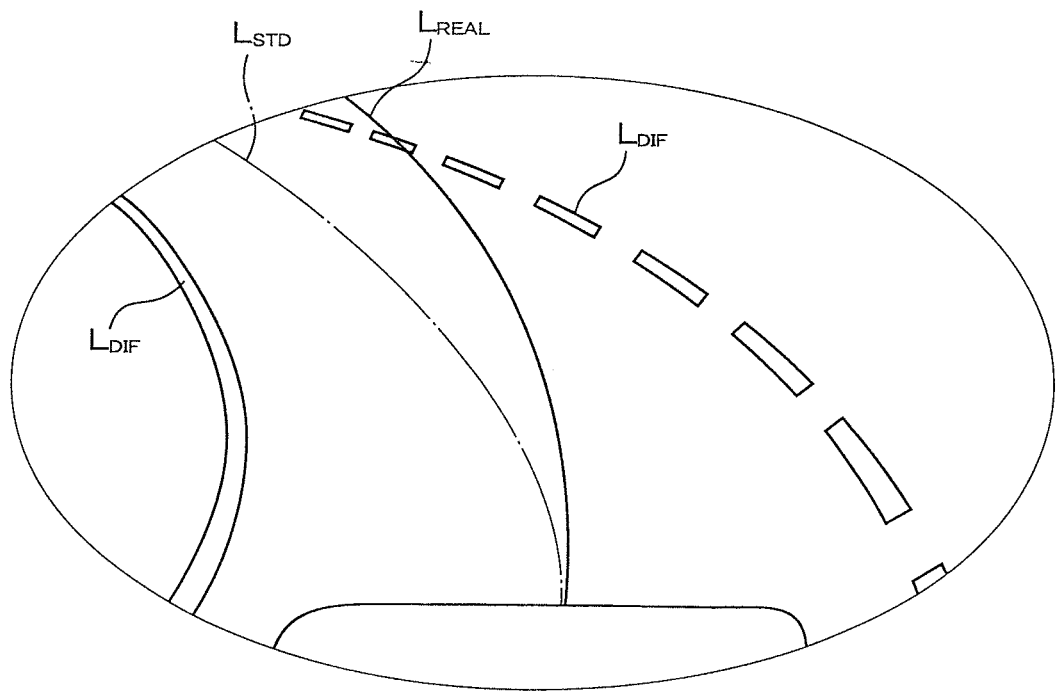
FIG. 10A is a view schematically illustrating a standard driving line identified as a standard running state and an actual driving line identified as an actual running state when a disturbance is handled by the disturbance handling system according to the second embodiment.

Unlike the disturbance handling portion 106, the disturbance handling portion 106' does not include the integral processing portion 152 and the steering moment determination portion 154. A crosswind-handling steering amount determination portion 162' for determining the crosswind-handling steering amount $\psi$ greatly differs in function from the crosswind-handling steering amount determination portion 162 of the disturbance handling portion 106. To the crosswind-handling steering amount determination portion 162', front-view image information obtained by the camera 94 is sent from the steering assist ECU 92. When the crosswind that should be handled is occurring, namely, when the yaw rate deviation $\Delta Yr$ sent from the disturbance detecting portion 104 is not "0", the crosswind-handling steering amount determination portion 162' identifies a standard driving line $L_{STD}$ of the vehicle and an actual driving line $L_{REAL}$ on which the vehicle is anticipated to actually drive, as schematically shown in FIG. 10A, based on the front-view image information, information on the vehicle running speed V sent from the brake ECU 66, information on the steering operation angle $\delta$ sent from the steering ECU 42, information on the actual yaw rate $Yr_{SEN}$ from the yaw rate sensor 108, information on the lateral acceleration Gy from the lateral acceleration sensor 110, etc. The actual driving line $L_{REAL}$ is an index of a state in which the vehicle will be placed when the vehicle will actually run, i.e., an index of an actual running state. In FIG. 10A, the standard driving line $L_{STD}$ is defined by a virtual line set in the middle of the driving lane in which the vehicle is driving and which is demarcated by a pair of lane markers $L_{DIF}$. Further, FIG. 10A illustrates a state in which the vehicle is deflected by the crosswind acting thereon and the actual driving line $L_{REAL}$ is shifted in the right direction from the standard driving line $L_{STD}$ curved in the left direction.

The crosswind-handling steering amount determination portion 162' determines, as the crosswind-handling steering amount iv, the steering amount of the front wheels 10F required for canceling a deviation of the actual driving line $L_{REAL}$ from the standard driving line $L_{STD}$. The deviation is an amount of shift of the actual driving line $L_{REAL}$ from the standard driving line $L_{STD}$. The process for determining the crosswind-handling steering amount $\psi$ is known in the art, and explanation thereof is dispensed with. In this respect, the deviation of the actual driving line $L_{REAL}$ from the standard driving line $L_{STD}$ can be considered as the degree of influence of the disturbance.

Figure 10B:
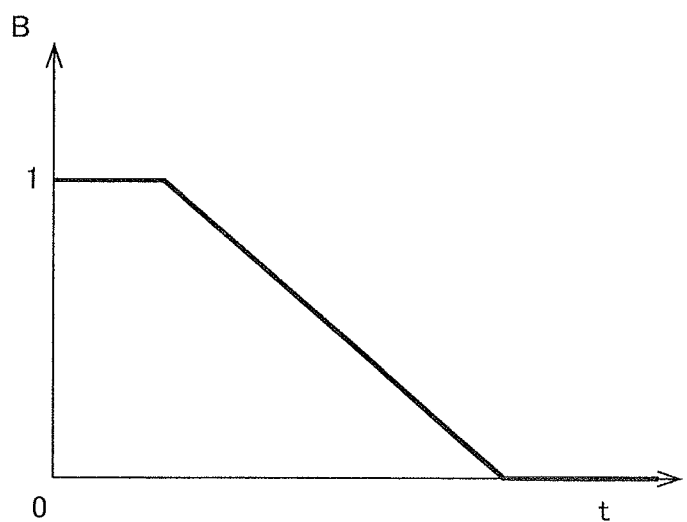
FIG. 10B is a graph showing an adjustment gain determined by a disturbance handling portion.

Like the disturbance handling portion 106, the disturbance handling portion 106' includes the brake moment determination portion 150, the adjusting portion 158, and the crosswind-handling wheel braking force determination portion 160. Functions of those portions 150, 158, 160 are the same as those of the disturbance handling portion 106, and explanation thereof is dispensed with. It is noted, however, that the adjustment gain determination portion 156' configured to determine the adjustment gain B used for gradually decreasing the brake counter moment Mb differs in the process for determining the adjustment gain B from the adjustment gain determination portion 156 of the disturbance handling portion 106. The adjustment gain determination portion 156' determines the adjustment gain B referring to map data shown in a graph of FIG. 10B, not based on the yaw rate deviation integral value ∫ΔYrdt, but based on a lapse of the time t from the time point of the occurrence of the crosswind, namely, from the time point when the yaw rate deviation ΔYr sent from the disturbance detecting portion 104 is no longer equal to "0". Specifically, the adjustment gain B is determined to be "1" at the time point of the occurrence of the crosswind, and thereafter gradually decreases to "0" with a lapse of the time t. By thus determining the adjustment gain B, the brake counter moment Mb is gradually decreased in the disturbance handling system 100' of the second embodiment as shown in FIG. 7D, as in the disturbance handling system 100 of the first embodiment.

The disturbance handling portion 106' includes a time counter portion 170 for measuring a lapse of the time t from the time point of the occurrence of the crosswind. The time counter portion 170 measures the time t from the time point when the yaw rate deviation ΔYr sent from the disturbance detecting portion 104 is no longer equal to "0" and resets the measured time t when the vehicle no longer receives the crosswind to be handled, namely, resets the measured time t when the yaw rate deviation ΔYr sent from the disturbance detecting portion 104 becomes equal to "0".

In a case where the steering device 12 steers the front wheels 10F based on the crosswind-handling steering amount $\psi$ determined by the crosswind-handling steering amount determination portion 162', there is a possibility that the front wheels 10F may be abruptly steered. The disturbance handling portion 106' includes a crosswind-handling steering amount limiting portion 172 for limiting the value of the crosswind-handling steering amount $\psi$ so as not to be excessively large. Specifically, when the crosswind-handling steering amount $\psi$ determined by the crosswind-handling steering amount determination portion 162' is larger than a set steering amount $\psi_0$ that is set at a relatively small value, the crosswind-handling steering amount limiting portion 172 determines the crosswind-handling steering amount $\psi$ to be equal to the set steering amount $\psi_0$. Though not explained in detail, the crosswind-handling steering amount $\psi$ takes both a positive value and a negative value depending upon the direction of steering. In a strict sense, two values, i.e., a positive value and a negative value, are prepared for the set steering amount $\psi_0$ in accordance with the positive value and the negative value of the crosswind-handling steering amount y. An absolute value of each of the positive value and the negative value of the set steering amount $\psi_0$ is set at a relatively small value.

The crosswind-handling steering amount $\psi$ is sent to the steering ECU 42, and the steering device 12 steers the front wheels 10F based on the crosswind-handling steering amount $\psi$. Owing to provision of the crosswind-handling steering amount limiting portion 172 configured as described above, the front wheels 10F are relatively gently steered for reducing the deflection of the vehicle due to the crosswind. In other words, the automatic steering of the vehicle to handle the crosswind is performed not abruptly but gradually. The steering amount of the wheels 10F is considered as the steering amount that is an amount by which the orientation of the vehicle changes. The disturbance handling portion 106' is configured to limit a change gradient of the steering amount to be not larger than a set gradient. By thus limiting the steering amount and by gradually decreasing the brake counter moment Mb as described above, this configuration enables the handling of the crosswind disturbance to be smoothly shifted from handling by the brake device to handling by the steering device.

In the crosswind handling by the steering device 12 described above, the standard driving line $L_{STD}$ is used as an index of the standard running state, and the automatic steering is performed such that the actual driving line $L_{REAL}$ coincides with the standard driving line $L_{STD}$. The crosswind handling by the steering device 12 may be performed otherwise. For instance, a state in which the vehicle does not run off a lane within which the vehicle is to travel may be used as the standard running state, and the automatic steering may be performed by the steering device 12 such that the vehicle does not cross the right-side and left-side lane markers $L_{DIF}$. That is, automatic steering similar to that by the LKA control described above may be performed. Because the two sorts of the automatic steering are similar to or the same as the LKA control, the crosswind handling by the steering device 12 may be performed by the steering assist device 90. In this instance, the steering assist ECU 92 constitutes a part of the disturbance handling system 100'. Further, the handling of the crosswind by the steering device 12 in the situation in which the LKA control is being executed by the steering assist device 90 may be executed by the LKA control. In other words, there is no need to execute any special control with respect to the crosswind. In this instance, it is desirable that the steering amount be limited, namely, the change gradient of the steering amount be limited, in the LKA control.

In the disturbance handling system 100', the disturbance handling ECU 102' repeatedly executes a disturbance handling program relying on the standard running state at a short time pitch, e.g., about several to several tens of milliseconds (msec), so that the detecting process for detecting the crosswind and the handling process for handling the crosswind are executed. This program differs from the disturbance handling program (indicated by the flowchart of FIG. 8) executed in the disturbance handling system 100 of the first embodiment in that the program has different steps in place of S10-S16 of the disturbance handling program of the flow chart of FIG. 8. Accordingly, the disturbance handling program relying on the standard running state will be explained focusing on the different steps by referring to a flowchart of FIG. 11 that mainly indicates the different steps of the program.

Figure 8:
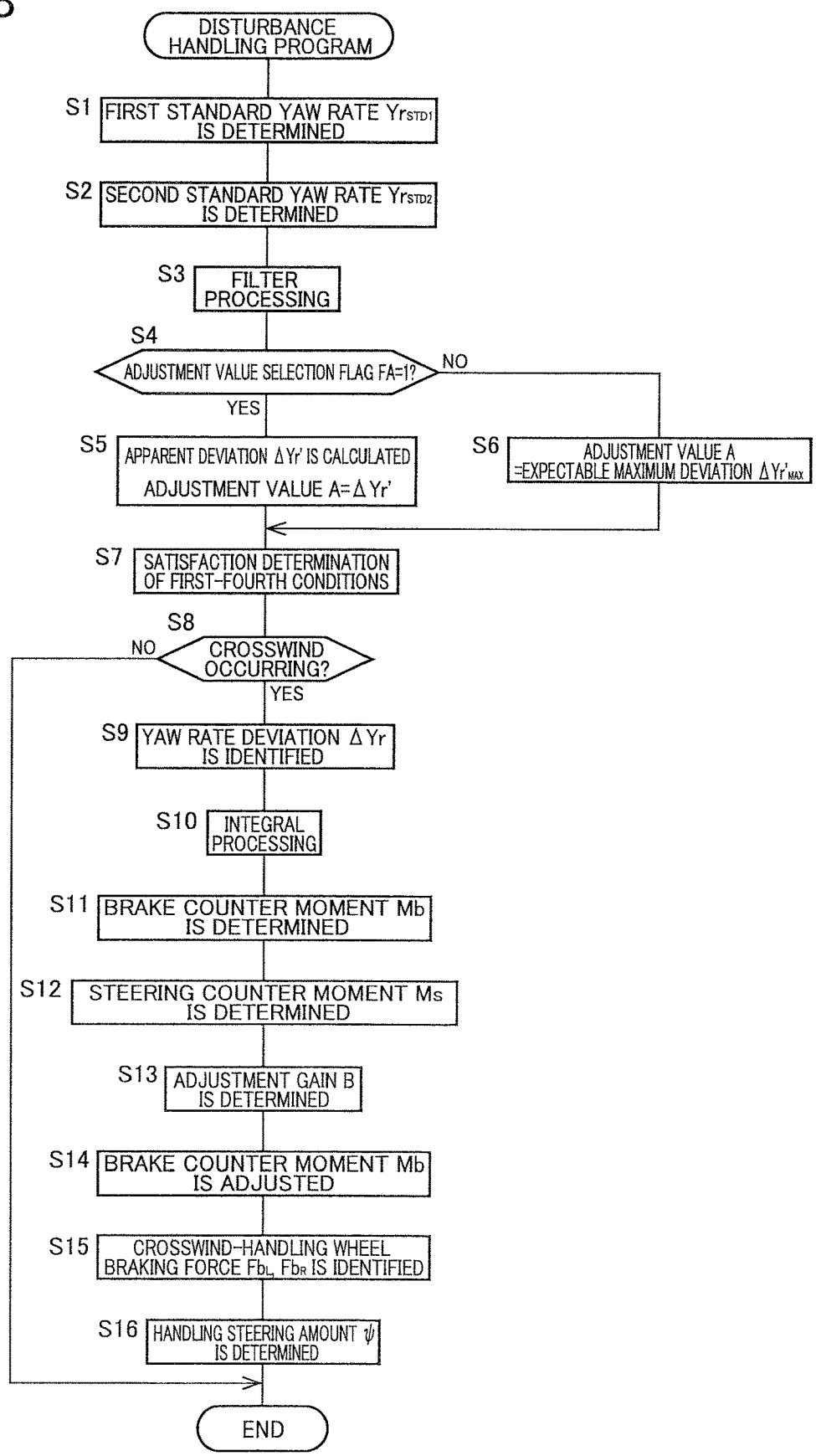
FIG. 8 is a flowchart indicating a disturbance handling program executed in the disturbance handling system according to the first embodiment.
Figure 11:
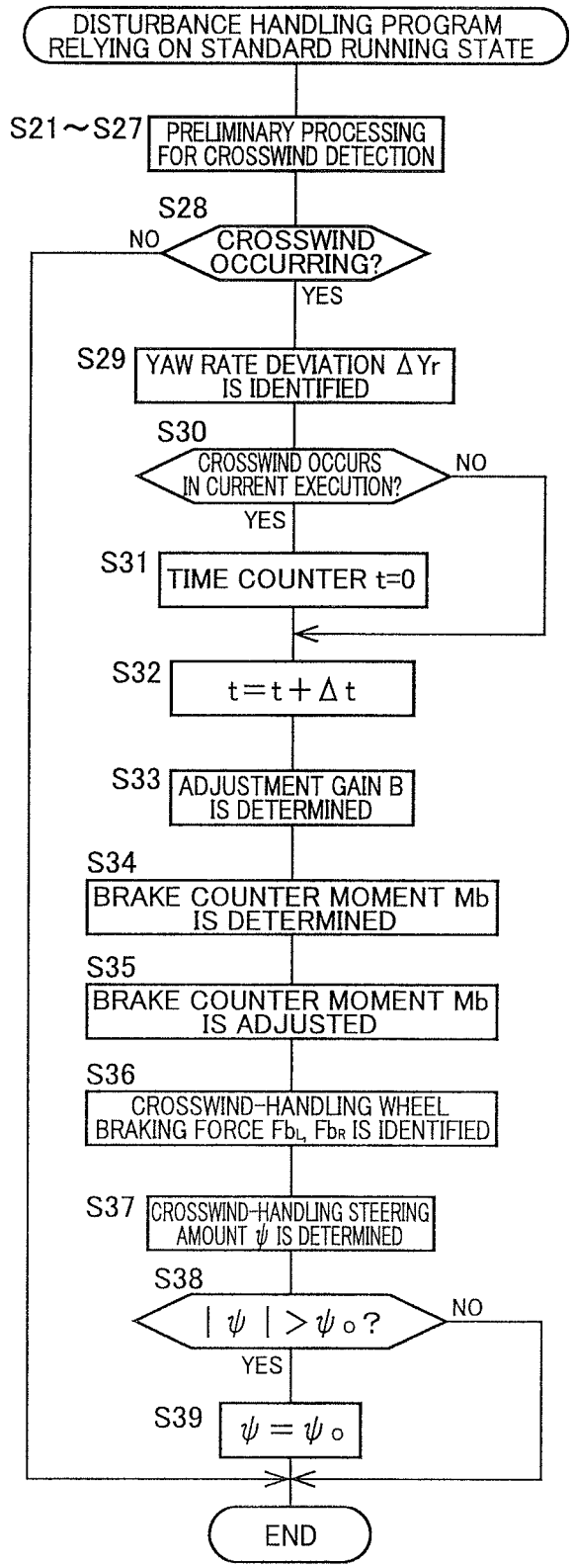
FIG. 11 is a flowchart indicating a disturbance handling program relying on a standard running state executed in the disturbance handling system according to the second embodiment.

In the disturbance handling program relying on the standard running state indicated by the flow chart of FIG. 11, processing similar to the processing of S1-S7 of the disturbance handling program indicated by the flow chart of FIG. 8 is executed. That is, preliminary processing for crosswind detection at S21-S27 is executed. It is subsequently determined at S28 whether the crosswind that should be handled is occurring. When it is determined that the crosswind is occurring, the yaw rate deviation ΔYr as the parameter indicative of the degree of influence of the crosswind is identified at S29, and S30 and subsequent steps are implemented. On the other hand, when it is determined that the crosswind that should be handled is not occurring, one execution of the program ends without implementing S29 and subsequent steps.

When the crosswind that should be handled is occurring, it is determined at S30 whether the crosswind occurs for the first time in current execution of the program. In other words, it is determined whether the crosswind has been detected in previous execution of the program. When it is determined that the crosswind occurs for the first time in current execution of the program, a time counter t for indicating a lapse of time from the time point of the occurrence of the crosswind is reset at S31. At S32, the time counter t is incremented by a count-up value Δt. On the other hand, when it is determined that the crosswind does not occur for the first time in current execution of the program, namely, when it is determined that the crosswind has already occurred in previous execution of the program, the time counter t is not reset but is incremented by the count-up value Δt at S32. At S33, the adjustment gain B is determined referring to map data shown in FIG. 10B based on the count value of the time counter t. Processing at S34-S36 is similar to the processing of S11, S14, S15 in the disturbance handling program. Thus, a detailed explanation thereof is dispensed with.

At S37, the actual driving line $L_{REAL}$ and the standard driving line $L_{STD}$ as the index of the standard running state are identified based on the front-view image information, the vehicle running speed V, the steering operation angle δ, the actual yaw rate $Yr_{SEN}$, the lateral acceleration Gy, etc., and the crosswind-handling steering amount y is determined based on the deviation of the actual driving line $L_{REAL}$ from the standard driving line $L_{STD}$. At S38, it is determined whether the determined crosswind-handling steering amount ψ is larger than the set steering amount $ψ_0$, namely, whether the absolute value of the determined crosswind-handling steering amount ψ is larger than the set steering amount $ψ_0$. When the crosswind-handling steering amount ψ is not larger than the set steering amount $ψ_0$, the crosswind-handling steering amount ψ is output as it is. When the crosswind-handling steering amount ψ is larger than the set steering amount $ψ_0$, on the other hand, the crosswind-handling steering amount ψ is limited to the set steering amount $ψ_0$ at S39, and the limited crosswind-handling steering amount ψ is output.

What is claimed is:

1. A disturbance handling system installed on a vehicle equipped with a steering device for handling a disturbance, the disturbance being an external force that acts on the vehicle and causes deflection of the vehicle, comprising:
a disturbance-handling electronic control unit including a computer as a main constituent element and configured to execute:
i) a disturbance detecting process of determining an occurrence of the disturbance and estimating a degree of influence of the disturbance; and
ii) a disturbance handling process of causing the steering device to handle the disturbance based on the estimated degree of influence of the disturbance,
wherein it is determined in the disturbance detecting process that the disturbance is occurring when a deviation of an actual yaw rate from a standard yaw rate is larger than a set threshold, the standard yaw rate being a yaw rate of the vehicle determined based on a steering operation,
wherein, in a normal condition, the steering device applies an assist force for assisting steering of a wheel based on an operation force applied to a steering operation member by a driver,
wherein, when the vehicle is departing from or is about to depart from a driving lane, the steering device positively steers the wheel instead of application of the assist force in the normal condition so as to perform automatic steering of the vehicle to steer the vehicle toward a middle of the driving lane, and
wherein, in the disturbance detecting process, the set threshold is made greater in a situation in which the vehicle is being automatically steered than in the normal condition so as to prevent an erroneous determination of the influence of the disturbance due to the automatic steering.

2. The disturbance handling system according to claim 1, which is configured to handle the disturbance due to a crosswind.

3. The disturbance handling system according to claim 1, wherein the disturbance detecting portion is configured to change the set threshold in accordance with a magnitude of a steering operation force such that the set threshold increases with an increase in the steering operation force, the steering operation force being an operation force applied by a driver to a steering operation member of the steering device of the vehicle.

4. The disturbance handling system according to claim 3, wherein the disturbance detecting portion is configured to determine the standard yaw rate based on the steering operation, and
wherein the disturbance detecting portion is configured to estimate a variation amount of the steering operation that arises from the steering operation force and to determine a change amount of the set threshold based on the estimated variation amount of the steering operation.

5. The disturbance handling system according to claim 4, wherein the disturbance detecting portion is configured to estimate, based on the estimated variation amount of the steering operation, a variation amount of the yaw rate that will vary due to the variation amount of the steering operation and to determine the change amount of the set threshold based on the estimated variation amount of the yaw rate.

6. The disturbance handling system according to claim 1, wherein the disturbance detecting portion changes the set threshold to a fixed value in a situation in which the vehicle is being automatically steered.

7. The disturbance handling system according to claim 6, wherein the set threshold is set in advance based on a variation amount of a steering operation, the variation amount arising from a steering operation force whose value is estimated to be maximum in the situation in which the vehicle is being automatically steered, the steering operation force being an operation force applied by a driver to a steering operation member of the steering device of the vehicle.

8. The disturbance handling system according to claim 1, wherein, when detecting the disturbance due to a crosswind, the disturbance detecting portion determines a first standard yaw rate as the standard yaw rate, also based on lateral acceleration that is being generated in the vehicle, and wherein, when a deviation of the first standard yaw rate from a second standard yaw rate that is another standard yaw rate determined not based on the lateral acceleration is equal in sign to a deviation of an actual yaw rate from the second standard yaw rate, the disturbance detecting portion determines that the disturbance due to the crosswind is not occurring, irrespective of a degree of a deviation of the actual yaw rate from the first standard yaw rate.

\* \* \* \* \*